(12) United States Patent
Tanaka

(10) Patent No.: US 11,072,888 B2
(45) Date of Patent: **\*Jul. 27, 2021**

(54) FIBER PROCESSING DEVICE AND FIBROUS FEEDSTOCK RECYCLING DEVICE

(71) Applicant: SEIKO EPSON CORPORATION, Tokyo (JP)

(72) Inventor: Hiroshi Tanaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 16/220,536

(22) Filed: Dec. 14, 2018

(65) Prior Publication Data

US 2019/0194868 A1    Jun. 27, 2019

(30) Foreign Application Priority Data

Dec. 15, 2017   (JP) ............................ JP2017-240284

(51) Int. Cl.
| | |
|---|---|
| *D21D 5/06* | (2006.01) |
| *D21D 5/02* | (2006.01) |
| *D21D 5/16* | (2006.01) |
| *D21C 5/02* | (2006.01) |
| *B65G 53/66* | (2006.01) |

(Continued)

(52) U.S. Cl.
CPC ............... *D21D 5/06* (2013.01); *B65G 53/06* (2013.01); *B65G 53/66* (2013.01); *D21C 5/02* (2013.01); *D21D 5/026* (2013.01); *D21D 5/16* (2013.01); *D21F 9/00* (2013.01)

(58) Field of Classification Search
CPC .................................... D21D 5/06; D21D 5/16
See application file for complete search history.

(56) References Cited

U.S. PATENT DOCUMENTS

| | | |
|---|---|---|
| 4,441,232 A | 4/1984 | Underbrink et al. |
| 4,934,029 A | 6/1990 | Wilkes et al. |

(Continued)

FOREIGN PATENT DOCUMENTS

JP    H11-302990 A    11/1999

OTHER PUBLICATIONS

Sep. 21, 2020 Office Action issued in U.S. Appl. No. 16/225,766.
Dec. 31, 2020 Notice of Allowance issued in U.S. Appl. No. 16/225,766.

*Primary Examiner* — Anthony Calandra
(74) *Attorney, Agent, or Firm* — Oliff PLC

(57) ABSTRACT

Technology for efficiently extracting fiber from a feedstock containing fiber. A subunit has a mesh drum configured as a rotatable cylinder with mesh in at least part of its surface, and a case that houses the mesh drum. The case has a first opening and a second opening that communicate with a first area, and a third opening that communicates with a second area. First screened material is supplied from the first opening to the first area. The subunit discharges from the third opening waste, which is a first component of the first screened material moved by an air current from the first area to the second area, and discharges from the second opening by an air current processing feedstock, which is a second component of the first screened material that does not pass through the mesh drum with the air current and remains in the first area.

13 Claims, 12 Drawing Sheets

(51) Int. Cl.
*B65G 53/06* (2006.01)
*D21F 9/00* (2006.01)

(56) References Cited

U.S. PATENT DOCUMENTS

| | | |
|---|---|---|
| 5,003,669 A | 4/1991 | Wilkes et al. |
| 6,449,804 B1 | 9/2002 | Van Doom |
| 2011/0174698 A1* | 7/2011 | Bergstrom ............... D21D 5/16 |
| | | 209/240 |
| 2015/0090416 A1* | 4/2015 | Nakamura ............. B07B 13/16 |
| | | 162/263 |
| 2016/0243473 A1* | 8/2016 | Hicks .................... B01D 33/48 |
| 2019/0194868 A1 | 6/2019 | Tanaka |
| 2019/0218714 A1 | 7/2019 | Oguchi et al. |
| 2019/0301092 A1 | 10/2019 | Yamasaki |
| 2020/0011010 A1 | 1/2020 | Kobayashi |
| 2020/0011013 A1 | 1/2020 | Kobayashi |

\* cited by examiner

FIBER PROCESSING DEVICE AND FIBROUS FEEDSTOCK RECYCLING DEVICE

BACKGROUND

1. Technical Field

The present invention relates to a fiber processing device and a fibrous feedstock recycling device.

2. Related Art

Methods of recycling feedstock containing fiber such as recovered paper are known from the literature. See, for example, JP-A-H11-302990. When recycling such feedstock, extracting quality fiber with a high degree of whiteness from the feedstock is desirable. The method described in JP-A-H11-302990 defibrates the fiber in the feedstock by a wet defibration process, then deinks the fiber by adding hydrogen peroxide to improve whiteness, and then washes the fiber.

The system described in JP-A-H11-302990 requires a wet process in which the fiber is dispersed in water for processing. Because wet processing requires large volumes of water to separate the fibers in the feedstock, the configuration of the equipment easily becomes complex and making the equipment and system smaller is difficult. A method of efficiently extracting fiber from the feedstock is therefore desirable when processing feedstock containing fiber.

SUMMARY

The present invention is directed to this problem, and an objective of the invention is to efficiently extract fiber from feedstock containing fiber.

To achieve the foregoing objective, a fiber processing device according to an aspect of the invention has a mesh member configured as a rotatable cylinder having mesh in at least part of the circumferential surface; and a case housing the mesh member, and having a first opening and a second opening communicating with a first area inside of the mesh member, and a third opening communicating with a second area outside the mesh member; the fiber processing device supplying separator feedstock containing fiber from the first opening to the first area, discharging from the third opening a first component of the separator feedstock that past by an air current through the mesh member and moved from the first area to the second area, and discharging from the second opening a second component of the separator feedstock that did not pass through the mesh member by the air current and remained in the first area.

This configuration separates the first component that passes through the mesh of the mesh member, and the second component, which does not pass through, by changing the air current in the case between flowing from the first opening to the third opening, and flowing to the second opening. Because the mesh member is a rotatable cylinder, rotating the mesh member can cause the second component to disperse. As a result, a drop in separation efficiency due to uneven distribution of the second component can be prevented. The components contained in the separator feedstock can therefore be efficiently separated and fiber can be extracted.

In another aspect of the invention, the mesh member has multiple blades arrayed in the circumferential direction on the circumferential surface.

This configuration can produce an air current by rotation of the mesh member. As a result, fiber can be more efficiently extracted from the separator feedstock.

In another aspect of the invention, the mesh member has multiple openings that are longer along the axis of rotation than the circumferential direction.

The mesh openings in this configuration are shaped so that fiber contained in the separator feedstock can pass through with appropriate ease when the mesh member is rotated, and fiber of the desirable size can be extracted from the separator feedstock.

Another aspect of the invention also has a cleaner configured to remove from the mesh member the second component accumulated in the first area on an inside surface of the mesh member.

This configuration can reliably remove the second component that does not pass through the mesh and remains inside the mesh member, and can more efficiently separate the second component from the separator feedstock.

In another aspect of the invention, the second opening is disposed vertically lower than the first opening in the state in which the fiber processing device is installed and operates.

Because the second component that does not pass through the mesh collects near the second opening, the second component can be easily recovered from the second opening.

In another aspect of the invention, the second opening connects to a vacuum configured to suction the second component.

This configuration enables quickly recovering the second component in the mesh member from the second opening.

In another aspect of the invention, the first opening connects to a first air current generator configured to supply an air current from the first area to the second area.

This configuration enables supplying the separator feedstock with the air current to the first area, and more efficiently separating the separator feedstock into the first component and second component.

In another aspect of the invention, the third opening connects to a second air current generator configured to supply an air current from the first area to the second area.

This configuration can quickly remove with the air current from the third opening the first component that passed through the mesh with the air current.

A fiber processing device according to another aspect of the invention switches between a first state in which separator feedstock is supplied with an air current from the first opening to the first area, and the air current moves the first component from the first area to the second area, and discharges the first component from the third opening, and a second state in which a second component of the separator feedstock that did not pass through the mesh member in the first state and remained in the first area is recovered with an air current to the second opening.

By switching between a first state and a second state in which the direction of the air flow is different, separator feedstock introduced to the mesh member can be separated in a first component and a second component, and the first component and second component can be separately recovered.

To achieve the foregoing objective, another aspect of the invention is a fibrous feedstock recycling device including: a defibrator configured to defibrate feedstock containing fiber; a processor configured to process defibrated material produced by the defibrator; a conveyor configured to convey the defibrated material by an air conveyance current from the defibrator to the processor; and a separator disposed to the conveyor, and including a mesh member configured as a rotatable cylinder having mesh in at least part of the circumferential surface; and a case housing the mesh member, and having a first opening and a second opening communicating with a first area inside of the mesh member, and a third opening communicating with a second area outside the mesh member; the separator supplying separator feedstock containing fiber from the first opening to the first area, discharging from the third opening a first component of the separator feedstock that past by an air current through the mesh member and moved from the first area to the second area, and discharging from the second opening a second component of the separator feedstock that did not pass through the mesh member by the air current and remained in the first area.

By separating by a mesh member defibrated material conveyed from a defibrator, and supplying the second component that did not pass through the mesh to the processor, this aspect of the invention can extract and process fiber contained in the feedstock. In addition, by changing the air current flowing through the mesh member in the separator between flowing from the first opening to the third opening, and flowing to the second opening, a first component that passes through the mesh of the mesh member, and a second component that does not pass through, can be separated. Furthermore, because the mesh member is a rotatable cylinder, rotating the mesh member can cause the second component to disperse. As a result, a drop in separation efficiency due to uneven distribution of the second component can be prevented. The components contained in the defibrated material can therefore be efficiently separated, fiber can be extracted, and fiber can be efficiently processed.

To achieve the foregoing objective, another aspect of the invention is a fibrous feedstock recycling device including: a separator including a mesh member configured as a rotatable cylinder having mesh in at least part of the circumferential surface, and a case housing the mesh member, and having a first opening and a second opening communicating with a first area inside of the mesh member, and a third opening communicating with a second area outside the mesh member; an air current generator configured to produce an air current inside the case; and a controller configured to change a state of the air current generator between a first state producing an air current from the first area to the second area, and a second state producing an air current from the second area to the first area.

By supplying separator feedstock from the first opening to the mesh member in the first state, the separator feedstock can be separated into components that pass through the mesh and components that do not pass through, and the component that passes through the mesh can be recovered from the third opening. In addition, in the second state, the component that did not pass through the mesh can be recovered from the second opening. As a result, a separator feedstock can be supplied into the mesh member, and efficiently separated into components that pass through the mesh and components that do not pass through the mesh.

A fibrous feedstock recycling device according to another aspect of the invention also has: a supplier configured to supply separator feedstock containing fiber to the first area, and a collector configured to recover a second component that did not move from the first area to the second area by an air current flowing from the first area to the second area, connected to the first opening; a first control valve disposed between the first opening and the supplier, and changing to a state in which the separator feedstock can be supplied from the supplier to the first opening, and a state in which the separator feedstock cannot be supplied; and a second control valve disposed between the first opening and the collector, and changing to a state in which the second component can be collected by the collector from the second opening, and a state in which the second component cannot be collected; the controller changing the state of the first control valve and the second control valve appropriately to the change between the first state and second state.

By switching the opened and closed states of the first control valve and second control valve, this configuration can supply a separator feedstock from the supplier to the mesh member, and can recover the components that are separated by the mesh member. The separator feedstock can therefore be efficiently separated by controlling the valves.

A fibrous feedstock recycling device according to another aspect of the invention also has: a first separator and a second separator; and the controller repeatedly alternates the operating mode between a first mode in which the state of the air current generator to the first separator is the first state, and the state of the air current generator to the second separator is the second state; and a second mode in which the state of the air current generator to the first separator is the second state, and the state of the air current generator to the second separator is the first state.

This configuration alternately switches multiple separators to a first state for supplying the separator feedstock and recovering a first component, and a second state for recovering a second component. As a result, the fibrous feedstock recycling device can continuously separate the separator feedstock by the separator, and more efficiently extract fiber from the separator feedstock.

Other objects and attainments together with a fuller understanding of the invention will become apparent and appreciated by referring to the following description and claims taken in conjunction with the accompanying drawings.

DESCRIPTION OF EMBODIMENTS

1. General Configuration of a Sheet Manufacturing Apparatus

Figure 1:
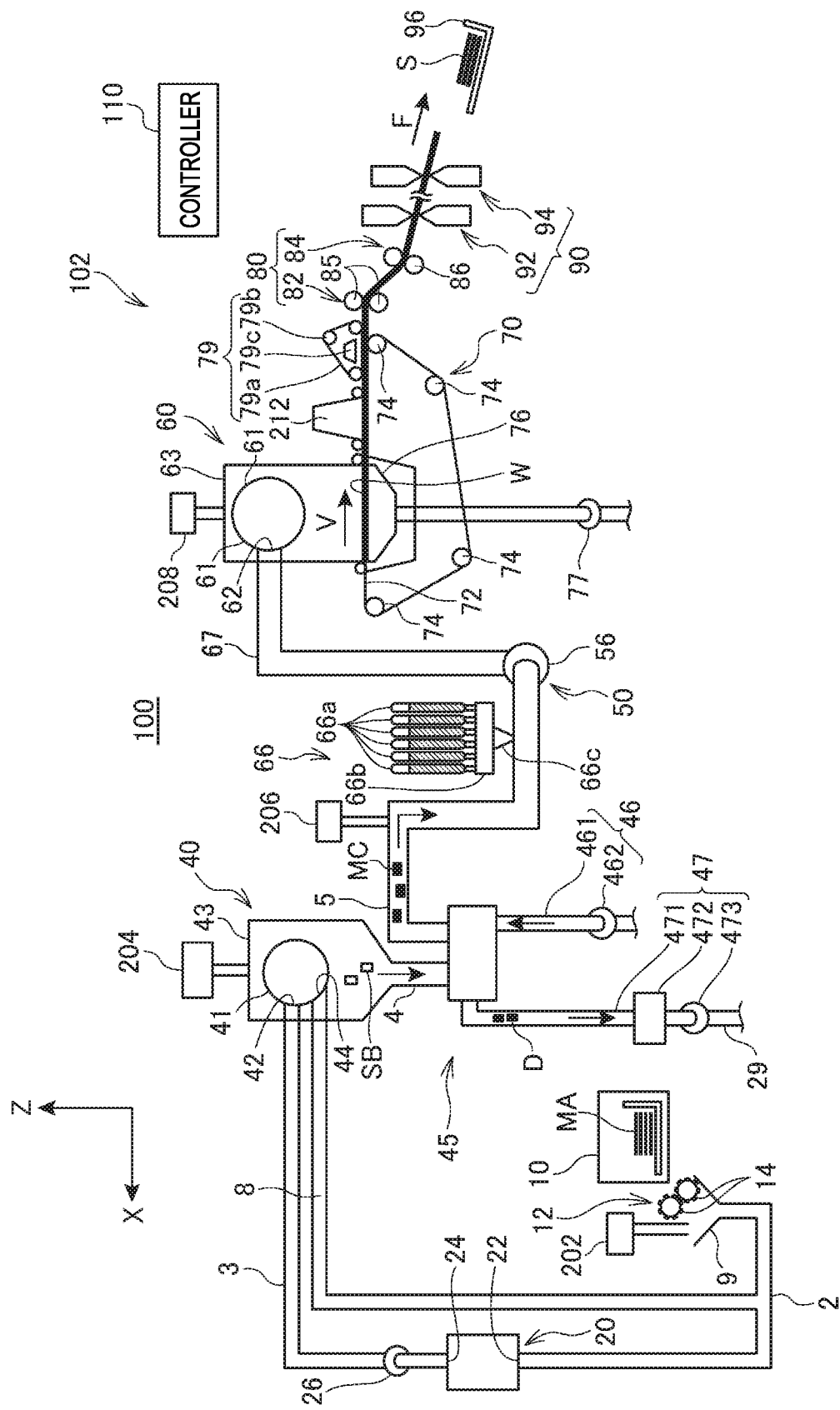
FIG. 1 illustrates the general configuration of a sheet manufacturing apparatus according to the first embodiment of the invention.

FIG. 1 schematically illustrates the configuration of a sheet manufacturing apparatus 100 according to the invention.

The sheet manufacturing apparatus 100 according to the invention is an example of a fibrous feedstock recycling device, and executes a recycling process of defibrating feedstock containing fiber (fibrous feedstock) into individual fibers, and then making new sheets from the fiber material. The sheet manufacturing apparatus 100 manufactures various types of sheets by defibrating feedstock in a dry process into individual fibers, and then compressing, heating, and cutting. By mixing various additives to the defibrated material, the sheet manufacturing apparatus 100 can also improve the binding strength and whiteness of the sheet, and impart desirable characteristics such as color, scent, and flame resistance. By controlling the density, thickness, and form of the paper, the sheet manufacturing apparatus 100 can also produce various kinds of sheets. Examples of such sheets include A4 and A3 size office paper, cleaning sheets (such as sheets for sweeping floors), sheets for absorbing oil, and sheets for cleaning toilets, and molded sheet such as paper plates.

In the following description of the invention, the Z direction is opposite direction as the direction of the force of gravity, and indicates up. The opposite direction as the Z direction is the direction of the force of gravity, and indicates down. The Z direction also indicates the height of the case 451 of the separator 45 described below. The Y direction is the direction of the axis of rotation of the mesh drum 48 (mesh member) described below. The X direction and the Y direction are perpendicular to the Z direction and perpendicular to each other. The X direction is aligned with the direction of the width of the case 451. The X direction indicates the left, and the opposite of the X direction indicates the right. The Y direction is aligned with the depth of the case 451, that is, the direction between the front and back of the case 451. The Y direction indicates the front of the case 451, and the opposite direction as the Y direction indicates the back of the case 451.

The sheet manufacturing apparatus 100 has a supply device 10, shredder 12, defibrator 20, classifier 40, separator 45 (fiber processing device), mixing device 50, air-laying device 60 (accumulator), web former 70, conveyance device 79, sheet forming device 80, and cutting device 90. The sheet manufacturing apparatus 100 also has a controller 110 that controls parts of the sheet manufacturing apparatus 100.

The sheet manufacturing apparatus 100 also has multiple wetting units (humidifiers) 202, 204, 206, 208, 210, 212 for wetting (humidifying) the feedstock, and/or wetting (humidifying) the spaces through which the feedstock travels. The specific configuration of the wetting devices 202, 204, 206, 208, 210, 212 may be designed as desired, and steam, evaporative, warm air vaporization, ultrasonic, or other type of humidification method may be used.

In this embodiment, wetting devices 202, 204, 206, 208 are evaporative or warm air vaporization humidifiers, have a filter (not shown in the figure) that is wetted with water, and supply humidified air with a high humidity level by passing air through the filter.

Wetting devices 210 and 212 are ultrasonic humidifiers, have a vibrator for atomizing water, and supplies the mist produced by the vibrator.

The supply device 10 supplies to the shredder 12 feedstock MA that the sheet manufacturing apparatus 100 recycles into sheets.

The feedstock MA is material containing fiber, and may be, for example, paper, pulp, pulp sheets, cloth, including nonwoven cloth, or textiles, for example. The feedstock of the sheet manufacturing apparatus 100 may be used paper, waste paper, or other types of recovered paper, or unused (virgin) paper. The sheet manufacturing apparatus 100 described below uses recovered paper (including waste paper) as the feedstock.

The supply device 10 has a tray (not shown in the figure) that holds feedstock MA loaded by the user, a roller (not shown in the figure) that feeds the feedstock MA from the tray, and a motor (not shown in the figure) that drives the roller. The supply device 10 feeds feedstock MA to the shredder 12 by operation of the motor.

The shredder 12 has a pair of shredder blades 14 that shred the feedstock MA supplied from the supply device 10 to between the shredder blades 14, and a chute (also referred to as a hopper) 9 that receives the paper shreds cut by and falling from the shredder blades 14. The shredder 12 shreds (cuts) the feedstock MA supplied from the supply device 10 in air by means of the shredder blades 14, producing coarse shreds. The shredder 12 in this example has the configuration of a common paper shredder, for example. The shape and size of the shreds is not specifically limited and is suitable to the defibrating process of the defibrator 20. In this example, the shredder 12 cuts the feedstock MA into shreds approximately one to several centimeters square or smaller. The cut shreds may be square or rectangular, for example, and are not limited to any precise shape.

The chute 9 has a tapered shape with a width that gradually narrows in the direction the shreds flow (the downstream direction), and connects to the defibrator 20. The shreds cut by the shredder blades 14 are collected through the chute 9 and conveyed (transported) through a conduit 2 to the defibrator 20.

Wet (humidified) air is supplied by a wetting device 202 into or near the chute 9 to suppress accretion of shreds inside the chute 9 or conduit 2 due to static electricity. Because the shreds are thus conveyed with humid air to the defibrator 20, accretion of defibrated material inside the defibrator 20 can also be expected. A configuration supplies humid air from the wetting device 202 to the shredder blades 14 to remove static from the feedstock MA, or an ionizer may be disposed as a static eliminator to the shredder 12 and defibrator 20.

The defibrator 20 defibrates the shreds produced by the shredder 12, and outputs defibrated material.

As used herein, defibrate means to break apart and detangle feedstock (in this example, shreds or other undefibrated fibrous material) composed of many fibers bonded together into single individual fibers. The defibrator 20 also has the ability to separate from the fibers various materials adhering to (bonded with) the feedstock, such as resin particles, ink toner, and bleeding inhibitors. The material that has past through the defibrator 20 is referred to as defibrated material.

In addition to defibrated fibers that have been separated, the defibrated material may contain additives that are separated from the fiber during defibration, including resin (resin bonding multiple fibers together), ink, toner, and other color additives, bleeding inhibitors, and paper strengthening agents. The shape of the fiber in the defibrated material may be as strings or ribbons. The fiber contained in the defibrated material may be as individual fibers not intertwined with other fibers, or as clumps, which are multiple fibers tangled with other defibrated material into clumps.

The defibrator 20 defibrates in a dry process. A dry process as used herein means that the defibration process is done in air instead of a wet solution. The defibrator 20 uses a defibrator such as an impeller mill in this example. More specifically, the defibrator 20 has a rotor (not shown in the figure) that turns at high speed, and a liner (not shown in the figure) positioned around the outside of the rotor. The shreds produced by the shredder 12 in this configuration go between the rotor and the liner of the defibrator 20 and are defibrated.

The defibrator 20 produces an air current by rotation of the rotor. By this air current the defibrator 20 suctions the shreds from the conduit 2, and conveys the defibrated material to the exit 24. The defibrated material is delivered from the exit 24 through another conduit 3 to the classifier 40.

The sheet manufacturing apparatus 100 also has a defibrator blower 26 as an air current generator. The defibrator blower 26 is a fan disposed to the conduit 3, and suctions and pulls air with the defibrated material from the defibrator 20 to the classifier 40. The defibrated material is conveyed to the classifier 40 by the air current produced by the defibrator 20 and the air current produced by the defibrator blower 26.

The classifier 40 has an inlet 42, and defibrated material defibrated by the defibrator 20 flows from the conduit 3 with the air current into the inlet 42. The classifier 40 classifies the defibrated material introduced from the inlet 42 based on fiber length. More specifically, the classifier 40 separates the defibrated material defibrated by the defibrator 20 into first screened material SB (separator feedstock) consisting of defibrated material of a predetermined size or smaller, and second screened material consisting of defibrated material that is larger than the first screened material SB. The first screened material SB contains both fiber and particulate. The second screened material includes, for example, large fibers, undefibrated clumps (shreds that have not been sufficiently defibrated), and clumps of agglomerated or tangled defibrated threads.

The classifier 40 has a drum 41, and a housing 43 enclosing the drum 41.

The drum 41 is a cylindrical structure with a mesh, and the mesh may be a filter or a screen, for example. The mesh may be a metal screen, expanded metal made by expanding a metal sheet with slits formed therein, or punched metal having holes formed by a press in a metal sheet, for example. The drum 41 is driven rotationally by a motor (not shown in the figure), and functions as a sieve. By appropriately setting the size of the mesh, the drum 41 separates the defibrated material into first screened material SB that is smaller than the mesh openings, and second screened material that is larger than the mesh openings.

More specifically, by rotation of the drum 41, the first screened material SB passes through the mesh openings of the drum 41 and precipitates. The second screened material that cannot pass through the mesh of the drum 41 is carried to the exit 44 and pulled into the conduit 8 by the air current flowing from the inlet 42 to the drum 41.

The conduit 8 is connected between the inside of the drum 41 and conduit 2, and second screened material flowing from the drum 41 into the conduit 8 passes with the shreds from the shredder 12 through the conduit 2, and is carried into the inlet 22 of the defibrator 20. As a result, the second screened material is returned to the defibrator 20 and defibrated.

The first screened material SB selected by the drum 41 is dispersed in the air current, and descends to the separator 45 located below the drum 41.

The separator 45 separates the first screened material SB supplied from the classifier 40 through conduit 4 by size. More specifically, the separator 45 separates the first screened material SB into feedstock for processing MC (deposited material separated material) that is greater than or equal to a predetermined size, and waste D (components) that are smaller than the predetermined size. The waste D contains primarily impurities such as particles of color agents and other additives as described above, short fibers that are not suited for recycling into new sheets S as described below, and is not used to make new sheets S. The processing feedstock MC contains primarily fiber, and consists primarily of fibers with a length suitable to making sheets S. In other words, the separator 45 separates the first screened material SB into processing feedstock MC containing fiber suitable as material for making sheets S, and waste D, which is material the remaining material not suitable for making sheets S.

The separator 45 is connected to the mixing device 50 through a conduit 5. The processing feedstock MC the separator 45 separates from the first screened material SB is carried from the separator 45 through the conduit 5 to the mixing device 50 by the suction produced by a mixing blower 56 (vacuum).

An air current generator 46 and a suction unit 47 (vacuum) are connected to the separator 45. The suction unit 47 includes a conduit 471, dust collector 472, and collection blower 473. The suction unit 47 suctions the waste D with the air current by pulling the air current through the conduit 471 from the separator 45 by the suction produced by the collection blower 473. The dust collector 472 is disposed to the conduit 471. The dust collector 472 is a filter or cyclonic dust collector, and separates particulate from the air current. The waste D separated by the separator 45 is collected by the dust collector 472 by the suction produced by the collection blower 473, and the air that passes through the dust collector 472 is discharged through a conduit 29 to the outside of the sheet manufacturing apparatus 100.

The air current generator 46 includes a conduit 461 and a supply blower 462. The supply blower 462 connects through the conduit 461 to the separator 45, and sends the air current produced by the supply blower 462 through the conduit 461 to the separator 45. The air current the air current generator 46 supplies is the conveyance current that carries processing feedstock MC from the separator 45 through the conduit 5.

Note that the configuration in the sheet manufacturing apparatus 100 for screening and separating the first screened material SB and second screened material is not limited to a classifier 40 with a drum 41. For example, a configuration that uses a classifier to classify defibrated material defibrated by the defibrator 20 may be used. Examples of such a classifier include cyclone classifiers, elbow jet classifiers, and eddy classifiers. If such a classifier is used, the defibrated material can be selectively separated into first screened material SB and second screened material.

In addition, a configuration that separates and removes impurities including relatively small or low density matter (such as resin particles, color agents, and other additives) from the defibrated material can be configured by using such a classifier. This enables a configuration that, for example, removes particles contained in the first screened material SB from the first screened material SB by means of the classifier.

Moist air is supplied by wetting device 204 to the space enclosing the drum 41. Wetting the first screened material SB by this moist air can be expected to have the effect of reducing accretion of first screened material SB in the case 451 due to static electricity, and facilitating removal of the processing feedstock MC from the case 451.

Humidified air is supplied by the wetting device 206 to the conduit 5, suppressing accretion of fiber in the conduit 5 due to static electricity. Furthermore, supplying humid air from conduit 5 to the mixing device 50 also has the effect of suppressing the effects of static in the mixing device 50.

The mixing device 50 has an additive supplier 66 that supplies an additive including resin, a conduit 67 through which an air current carrying the processing feedstock MC flows, and a mixing blower 56, and mixes an additive including resin with the fiber in the processing feedstock MC.

One or more additive cartridges 66a storing additives are installed to the additive supplier 66. The additive cartridges 66a may be removably installed to the additive supplier 66. The additive supplier 66 includes an additive extractor 66b that extracts additive from the additive cartridges 66a, and an additive injector 66c that injects the additive extracted by the additive extractor 66b into the conduit 67.

The additive extractor 66b has a feeder (not shown in the figure) that feeds additive in a powder or particulate form from inside the additive cartridges 66a, and removes additive from some or all of the additive cartridges 66a. The additive removed by the additive extractor 66b is conveyed to the additive injector 66c.

The additive injector 66c holds the additive removed by the additive extractor 66b. The additive injector 66c has a shutter (not shown in the figure) that opens and closes the connection to the conduit 67, and when the shutter is open, the additive extracted by the additive extractor 66b is fed into the conduit 67.

The shutter of the additive injector 66c has the effect of preventing excessive additive from being suctioned from the additive supplier 66 by the negative pressure produced by the air flow through the conduit 67.

The additive that the additive supplier 66 supplies includes resin that melt and bind multiple fibers together when heated. The resin contained in the additive may be a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive may contain only a single material or a mixture, both of which may comprise multiple types of particulate comprising a single or multiple materials. The additive supplied may also be a fibrous or powder form.

In addition to resin for binding fibers, and depending on the type of sheet being manufactured, the additive supplied from the additive supplier 66 may also include a coloring agent for coloring the fiber, an anti-blocking agent to prevent agglomeration of fibers and agglomeration of resin, or a flame retardant for making the fiber difficult to burn, for example. The additive not containing a coloring agent may be colorless or a color light enough to be considered colorless, or white.

The types and numbers of additives the sheet manufacturing apparatus 100 uses are not specifically limited, and additive cartridges 66a corresponding to the types of additives used are installed to the additive supplier 66. The sheet manufacturing apparatus 100 may also use only some, or use all, of the additive cartridges 66a installed to the additive supplier 66.

In this example, six additive cartridges 66a are installed to the additive supplier 66. The six additive cartridges 66a include an additive cartridge 52a holding a colorless additive or an additive of a nearly-colorless pale color, and an additive cartridge 52a holding an additive that colors the fiber white. There are also additive cartridges 66a holding additives for coloring the fibers C (cyan), M (magenta), and Y (yellow).

The amount of additive the additive extractor 66b extracts from each of the additive cartridges 66a is controlled by the controller 110. By the controller 110 controlling the additive supplier 66, the sheet manufacturing apparatus 100 can operate to manufacture sheets S without coloring the fiber contained in the processing feedstock MC, and can operate to color the fiber used to manufacture sheets S. By supplying additive from any one of the color additive cartridges 66a, fibers can be colored white, cyan, magenta, or yellow. For example, whiteness can be improved by mixing fibers with white additive. Additive supplied from multiple additive cartridges 66a can also be mixed to produce fibers of desirably blended colors.

The additive supplied from the additive supplier 66 is conveyed through the conduit 67 and mixed with the fiber in the processing feedstock MC by the air current produced by the mixing blower 56, and passes through the mixing blower 56. The processing feedstock MC are detangled into individual fibers while flowing through conduit 5 and conduit 67. The fibers in the processing feedstock MC and the additive from the additive supplier 66 are mixed by the air current produced by the mixing blower 56 and/or the action of the blades or other rotating members of the mixing blower 56, and the mixture is conveyed through the conduit 67 to the air-laying device 60.

The mechanism that mixes the processing feedstock MC and additive is not specifically limited, and may be configured by mixing with blades rotating at a high speed, a mechanism that uses rotation of the container, such as a V mixer, and the mixing mechanism may be disposed before or after the mixing blower 56.

The mixture that passes the mixing device 50 is introduced from the inlet 62 to the air-laying device 60. The air-laying device 60 detangles and disperses the tangled defibrated material (fiber) in air, causing the mixture to fall onto the web forming device 70. When the resin in the additive supplied from the additive supplier 66 is fibrous, the resin fibers are also detangled by the air-laying device 60 and fall onto the web forming device 70.

The air-laying device 60 has a drum 61 and a housing 63 around the drum 61. The drum 61 is a cylindrical structure configured identically to the drum 41, has mesh like the drum 41, is driven rotationally by a motor, and functions as a sieve.

Note that the sieve of the drum 61 may be configured without functionality for selecting specific material. More specifically, the sieve used in the drum 61 means a device having mesh, and the drum 61 may cause all of the mixture introduced to the drum 61 to precipitate from the drum 61.

A web forming device 70 is disposed below the drum 61. The web forming device 70 includes, for example, a mesh belt 72, rollers 74, and a suction mechanism 76.

The mesh belt 72 is an endless belt, is tensioned by multiple rollers 74, and by operation of the tension rollers 74 is driven in the direction indicated by the arrow V in the figure. The mesh belt 72 may be metal, plastic, cloth, or nonwoven cloth. The surface of the mesh belt 72 is a screen with an array of openings of a specific size.

Of the fiber and particles dropping from the air-laying device 60, particles of a size that passes through the mesh drops through the mesh belt 72. Fiber of a size that cannot pass through the openings in the mesh accumulates on the mesh belt 72 and is conveyed in the direction of arrow V with the mesh belt 72.

The mesh in the mesh belt 72 is fine, and is sized so that the majority of the fiber and particles that drop from the drum 61 cannot pass through the mesh belt 72. This configuration causes material that passes through the mesh of the drum 61 to accumulate in the web forming device 70, and the accumulated material forms a web W.

The suction mechanism 76 includes a suction blower 77 disposed below the mesh belt 72, and by the suction of the suction blower 77 produces a flow of air in the suction mechanism 76 from the air-laying device 60 to the mesh belt 72.

The suction mechanism 76 pulls the mixture distributed in air by the air-laying device 60 onto the mesh belt 72, thereby promoting formation of a web W on the mesh belt 72. The suction mechanism 76 also has the effect of increasing the discharge rate from the air-laying device 60, and by creating a downward air current in the path of mixture precipitation, can prevent interlocking of defibrated material and additive while descending to the mesh belt 72.

The suction blower 77 may be configured to pass air suctioned from the suction mechanism 76 through a collection filter not shown before being discharged to the outside of the sheet manufacturing apparatus 100. Alternatively, the suction blower 77 may push the suctioned air to the dust collector 27 to collect the impurities contained in the air suctioned by the suction mechanism 76.

Humidified air is supplied by the wetting device 208 to the space surrounding the drum 61. As a result, the inside of the air-laying device 60 can be humidified by the humidified air, fiber and particles accumulating on the housing 63 due to static electricity can be suppressed, fiber and particles can be made to fall quickly onto the mesh belt 72, and a web W of a desired form can be made.

Air carrying mist is supplied by the wetting device 212 to the conveyance path of the mesh belt 72 on the downstream side of the air-laying device 60. As a result, the water content of the web W can be adjusted, and accretion of fiber on the mesh belt 72 due to static electricity is also suppressed.

The web W formed by the air-laying device 60 and web forming device 70 is then separated from the mesh belt 72 and conveyed to the sheet forming device 80 by a conveyance device 79. The conveyance device 79 includes, for example, a mesh belt 79a, rollers 79b, and a suction mechanism 79c.

The suction mechanism 79c includes a blower (not shown in the figure), and by the suction force of the blower produces an upward air current on the mesh belt 79a. As a result of this air current, the web W separates from the mesh belt 72 and is pulled to the mesh belt 79a. The mesh belt 79a moves in conjunction with the rollers 79b, and conveys the web W to the sheet forming device 80.

The sheet forming device 80 binds fibers in the mixture through the resin contained in the additive by applying heat to the fiber and additive contained in the web W.

More specifically, the sheet forming device 80 has a compression device 82 that compresses the web W, and a heating device 84 that heats the web W after the web W is compressed by the compression device 82.

The compression device 82 in this example comprises a pair of calender rolls 85 that hold the web W with a specific nipping force, compress the web W to a high density, and convey the compressed web W to the heating device 84.

The heating device 84 has a pair of heat rollers 86 which heat the web W as it passes between the heat rollers 86 after being compressed by the calender rolls 85, forming a sheet S.

The cutting device 90 cuts the sheet S formed by the sheet forming device 80. In this example, the cutting device 90 has a first cutter 92 that cuts the sheet S crosswise to the conveyance direction of the sheet S indicated by the arrow F in the figure, and a second cutter 94 that cuts the sheet S parallel to the conveyance direction F. Single sheets of a specific size are formed by cutting the web W in this way. The single sheets S cut by the cutting device 90 are then stored in the discharge tray 96. The discharge tray 96 may be a tray or stacker for holding the manufactured sheets, and the sheets S discharged to the tray can be removed and used by the user.

Parts of the sheet manufacturing apparatus 100 are configured as a defibration process unit 101 and recycling unit 102.

The defibration process unit 101 comprises at least the supply device 10 and defibrator 20, and may include the classifier 40 and separator 45. The defibration process unit 101 produces defibrated material or processing feedstock MC from the feedstock MA. The product manufactured by the defibration process unit 101 may be removed from the sheet manufacturing apparatus 100 and stored without passing the mixing device 50. This manufactured product may also be sealed in specific packages, which may then be shipped and sold (marketed).

The recycling unit 102 is a functional unit that processes the product produced by the defibration process unit 101 into sheets S, includes the mixing device 50, web forming device 70, conveyance device 79, sheet forming device 80, and cutting device 90, and may also include an additive supplier 66.

The sheet manufacturing apparatus 100 may also be configured with the defibration process unit 101 and recycling unit 102 in an integrated system, or as separate devices. In this case, the defibration process unit 101 is an example of a fibrous feedstock recycling device according to the invention. The recycling unit 102 is an example of a sheet forming device that processes defibrated material into sheets. Each of these components may also be conceived of as processing devices.

2. Separator Configuration

Figure 2:
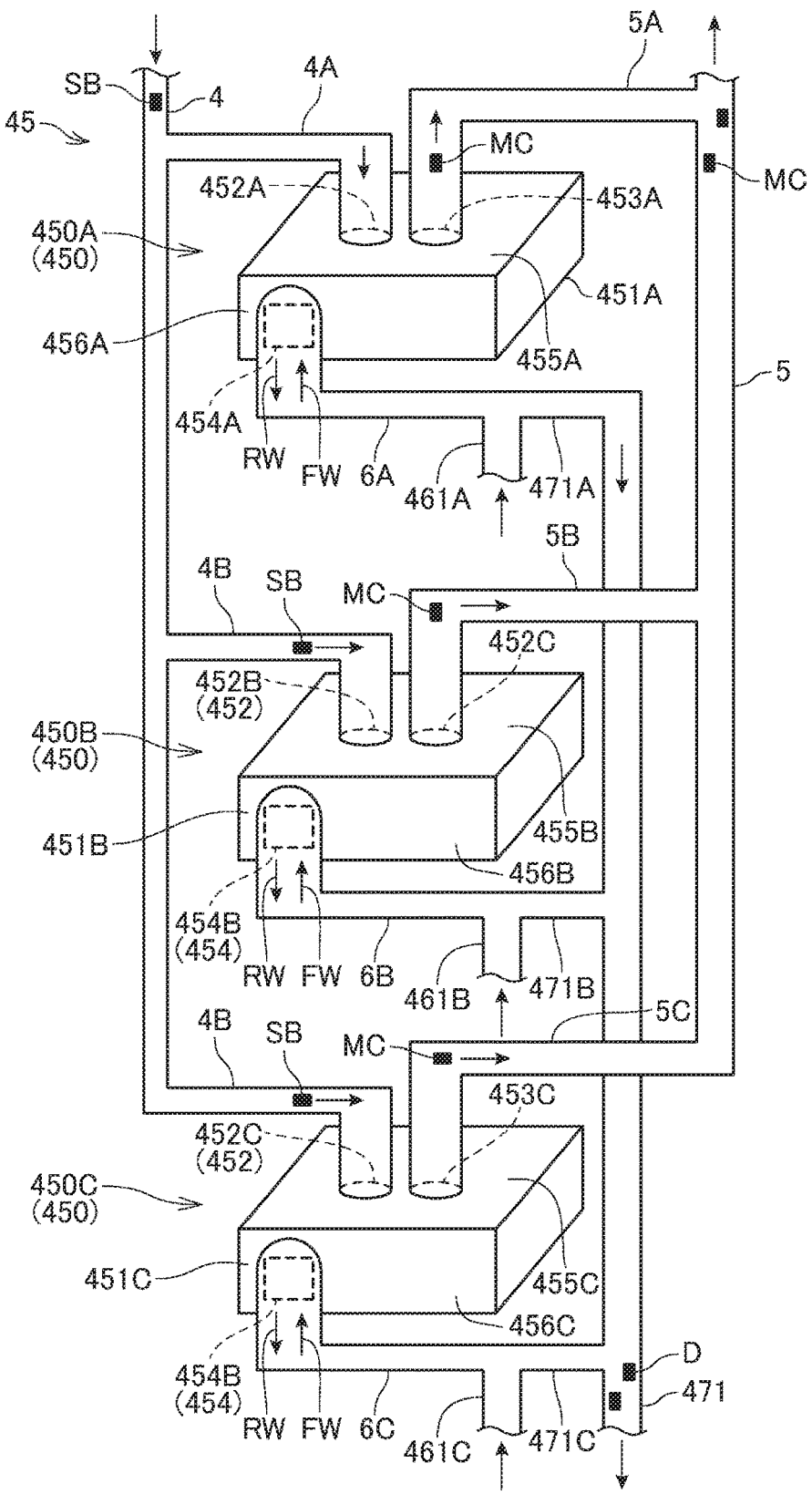
FIG. 2 illustrates the configuration of the separator.

The configuration of the separator 45 is described next. FIG. 2 schematically illustrates the configuration of separator 45. As shown in FIG. 2, the separator 45 has three subunits 450A, 450B, 450C. The subunits 450A, 450B, 450C have the same configuration, and are referred to as subunit 450 below unless differentiating the units. FIG. 2 mainly shows the connections between components of the separator 45, and the directions of the top, bottom, left, and right as seen in the figure do not necessary matching the directions (X, Y, Z in FIG. 1) when installed to the sheet manufacturing apparatus 100.

Each of subunits 450A, 450B, 450C has a hollow, box-like case 451A, 451B, 451C (housing). The cases 451A, 451B, 451C are collectively referred to as case 451 (housing).

Connected to the case 451A of subunit 450A are conduit 4A, conduit 5A, and conduit 6A. Formed in side 455A of case 451A are first opening 452A and second opening 453A; connected to the first opening 452A is conduit 4A, and connected to the second opening 453A is conduit 5A. Formed in side 456A of case 451A is third opening 454A, and connected to the third opening 454A is conduit 6A.

Likewise, connected to the case 451B of subunit 450B are conduit 4B, conduit 5B, and conduit 6B. Formed in side 455B of case 451B are first opening 452B and second opening 453B, connected to the first opening 452B is conduit 4B, and connected to the second opening 453B is conduit 5B. Formed in side 456B of case 451B is, third opening 454B and connected to the third opening 454B is conduit 6B Connected to the case 451C of subunit 450C are conduit 4C, conduit 5C, and conduit 6C. Formed in side 455C of case 451C are first opening 452C and second opening 453C, connected to the first opening 452C is conduit 4C, and connected to the second opening 453C is conduit 5C. Formed in side 456C of case 451C is third opening 454C, and connected to the third opening 454C is conduit 6C.

As appropriate below, first openings 452A, 452B, 452C are collectively referred to as first opening 452, second openings 453A, 453B, 453C as second opening 453, and third openings 454A, 454B, 454C as third opening 454.

Conduits 4A, 4B, 4C are conduits that branch from conduit 4, and the first screened material SB conveyed from the classifier 40 branches into conduits 4A, 4B, 4C, and is respectively conveyed to cases 451A, 451B, 451C.

Conduits 5A, 5B, 5C merge for form conduit 5. Conduits 5A, 5B, 5C respectively convey processing feedstock MC from case 451A, 451B, 451C to conduit 5, and the processing feedstock MC is conveyed from conduit 5 to the mixing device 50.

Connected to conduit 6A are conduit 461A and conduit 471A. Likewise, connected to conduits 6B, 6C are, respectively, conduits 461B, 461C, and conduits 471B, 471C.

Conduits 461A, 461B, 461C are conduits that branch from conduit 461, and the air current the supply blower 462 supplies passes through conduits 461B, 461C and is supplied to cases 451A, 451B, 451C, respectively.

Conduits 471A, 471B, 5C merge and communicate with conduit 471. Conduits 471A, 471B, 471C each convey waste D from case 451A, 451B, 451C to conduit 471, and the waste D is conveyed through conduit 471 to the dust collector 472.

Therefore, when air flows through conduit 6A from conduit 461A into case 451A, air also flows from case 451A into conduit 471A. These are air currents in opposite directions. More specifically, the third opening 454A to which the conduit 6A connects functions as both an air outlet and inlet. Third openings 454B, 454C also function as both an air outlet and inlet. More specifically, when air flows through conduit 6B from conduit 461B into case 451B, air also flows from case 451B into conduit 471B, and when air flows through conduit 6C from conduit 461C into case 451C, air also flows from case 451C into conduit 471C.

By changing the air current flowing through the conduit 6A, the sheet manufacturing apparatus 100 changes the operation of the subunit 450A between a first state and a second state. In the first state, first screened material SB is supplied from conduit 4A through the first opening 452A to the case 451A, and the first screened material SB is separated into processing feedstock MC and waste D inside the case 451A. Also in the first state, the current flowing in from the first opening 452A passes through the case 451A, and flows out with the waste D from the third opening 454A into the conduit 6A. In the second state, air flows from the conduit 6A through the third opening 454A, and this air current is discharged with the processing feedstock MC in the case 451A through the second opening 453A into conduit 5A.

By changing the air current flowing through the conduit 6A, the sheet manufacturing apparatus 100 also changes the operation of subunits 450B and 450C between a first state and a second state. In the first state, first screened material SB is supplied from conduit 4B, 4C through the first opening 452B, 452C to the case 451B, 451C, and the first screened material SB is separated into processing feedstock MC and waste D inside the case 451B, 451C. Also in the first state, the current flowing in from the first opening 452B, 452C passes through the case 451B, 451C, and flows out with the waste D from the third opening 454B, 454C into conduit 6B, 6C. In the second state, air flows from the conduit 4B, 4C through the third opening 454B, 454C, and this air current is discharged with the processing feedstock MC in the case 451B, 451C through the second opening 453B, 453C into conduit 5B, 5C.

The subunits 450A, 450B, 450C thus switch between a first state of separating the first screened material SB supplied from the classifier 40 and discharging the waste D, and a second state of discharging the processing feedstock MC. The sheet manufacturing apparatus 100 changes the operating state of the subunits 450A, 450B, 450C by controlling opening and closing the valves of the separator 45. This control operation is described below.

3. Subunit Configuration

Figure 3:
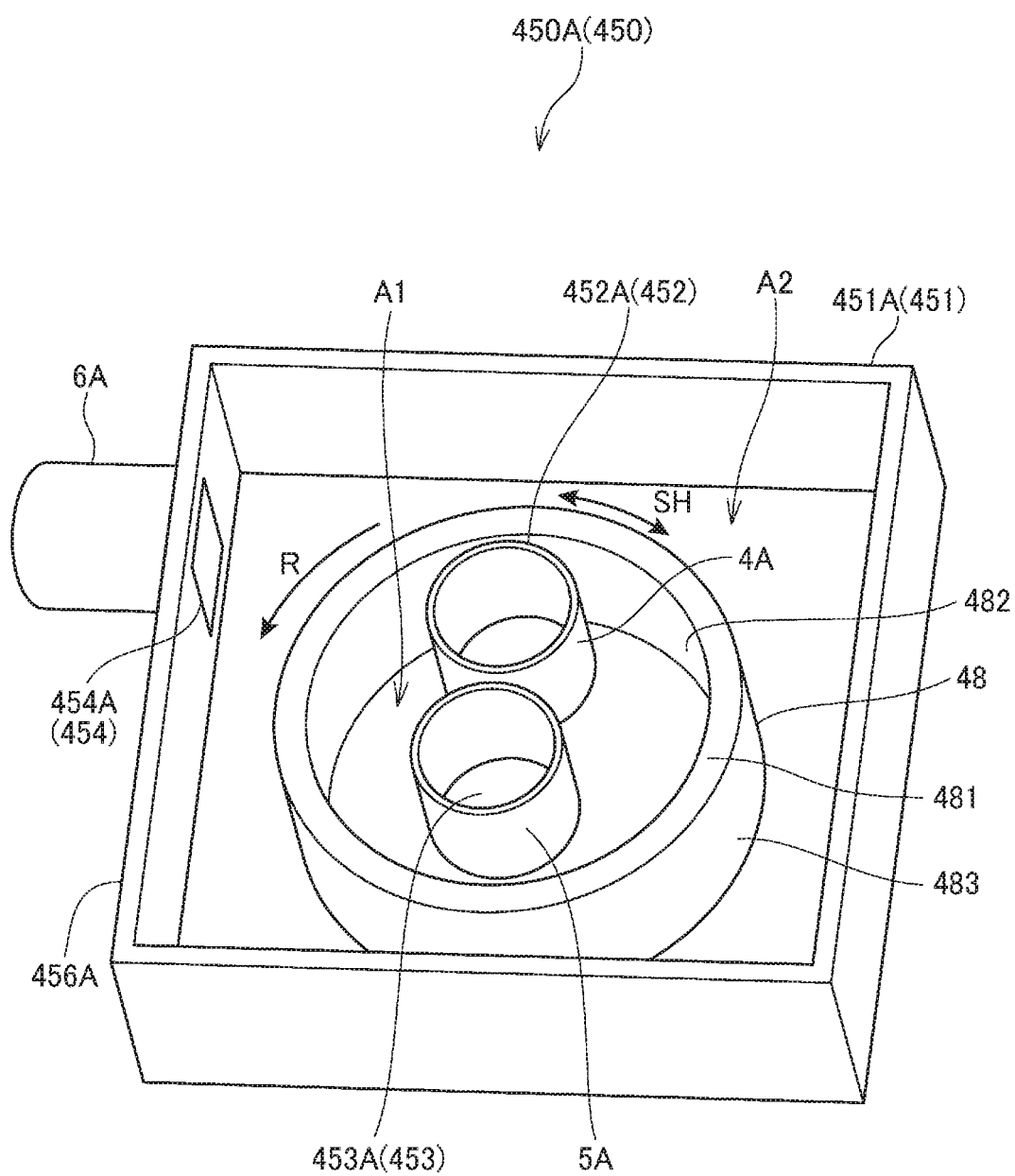
FIG. 3 is an oblique view showing the main parts of a subunit of the separator.
Figure 4:
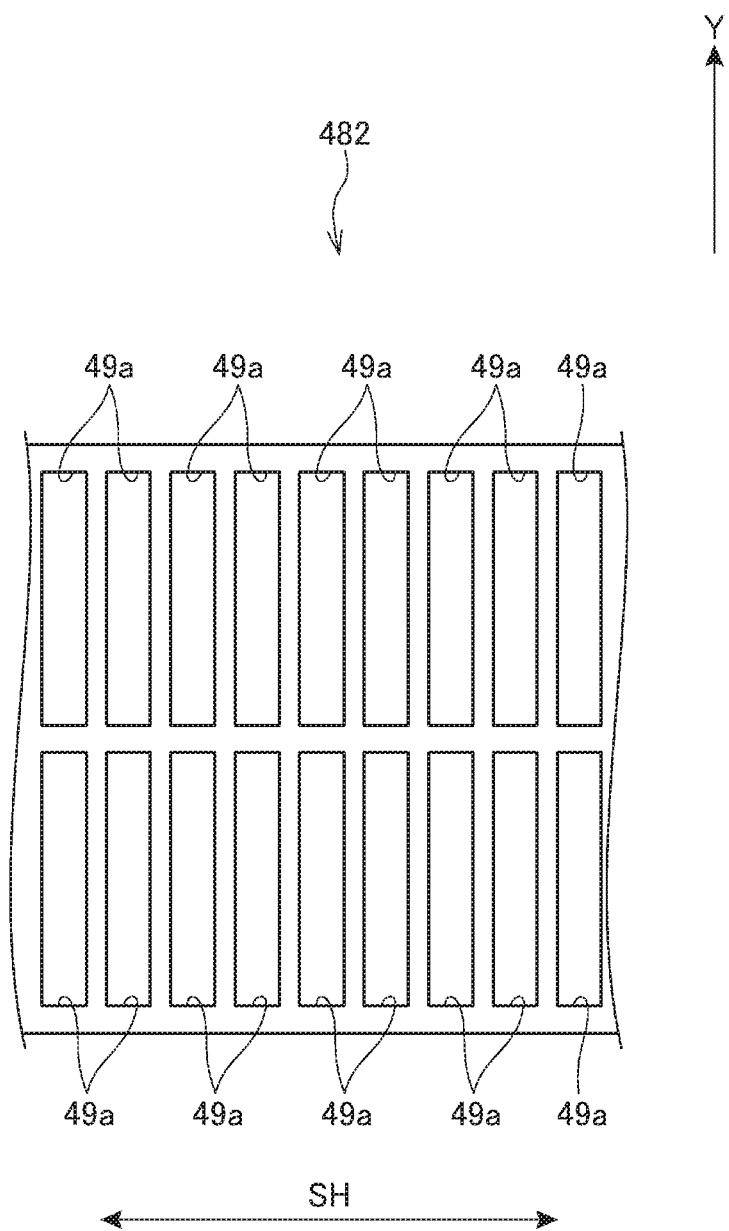
FIG. 4 is a side view of the main part of the mesh drum.
Figure 5:
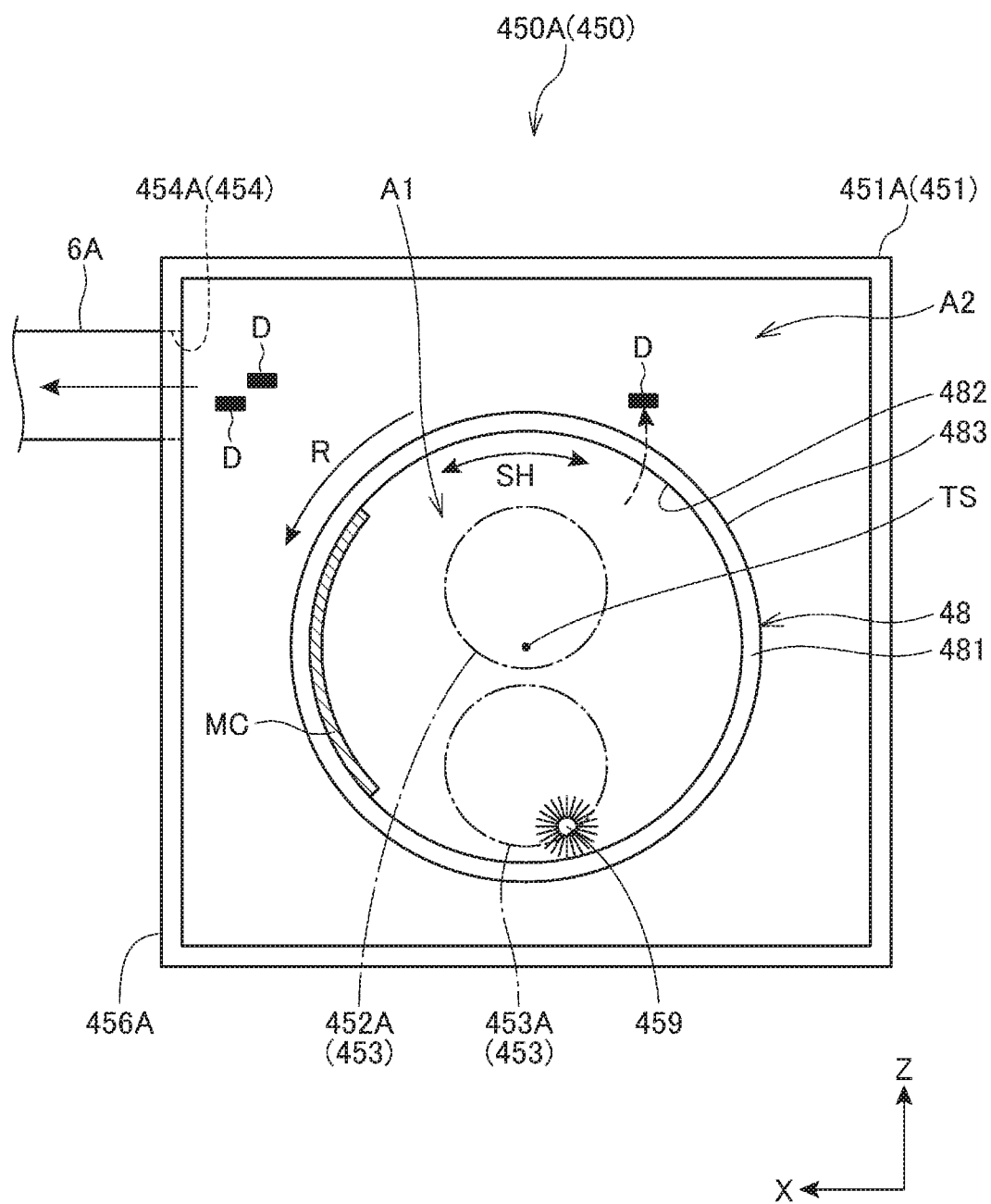
FIG. 5 is a front view of main parts of the subunit.

FIG. 3 is an oblique view of subunit 450A, and for ease of understanding omits side 455A to show the main parts of the subunit 450A. FIG. 4 is a side view of the main part of the mesh drum 48 of the subunit 450A, and FIG. 5 is a front view showing the main parts of the subunit 450A. Because the configuration of subunits 450B, 450C is the same as subunit 450A, subunit 450A is shown in the figures and described below while further discussion of subunits 450B, 450C is omitted.

As shown in FIG. 3, the case 451A is a hollow housing that holds the mesh drum 48. The mesh drum 48 is a cylindrical member in circumferential direction SH. The mesh drum 48 is disposed to the case 451A rotatably in direction R shown in the figure. When installed in the sheet manufacturing apparatus 100, the axis of rotation of the mesh drum 48 is on the vertical axis (Z direction).

In at least part of the inside circumference surface (the entire inside circumference surface in this example), the mesh drum 48 has mesh 482 comprising mesh openings 49a (FIG. 4) passing through the outside surface 483.

FIG. 4 is a side view showing part of the mesh 482 of the mesh drum 48. The Y direction in FIG. 4 indicates the direction of the axis of rotation of the mesh drum 48.

The mesh 482 comprises multiple mesh openings 49a (holes). The mesh openings 49a are formed in the direction of the axis of rotation (Y direction) of the mesh drum 48, and are arrayed in the circumferential direction SH. The size of the individual mesh openings 49a in the direction of the axis of rotation (Y direction) of the mesh drum 48 is longer than the size in the circumferential direction SH of the mesh drum 48.

The mesh 482 may be a punched metal or plastic panel having mesh openings 49a formed by a press, or a metal or plastic screen. The shape and size of the mesh openings 49a may also be the same or the mesh openings 49a may include different sizes or different shapes. For example, the mesh openings 49a in the configuration shown in FIG. 4 are rectangular, but the mesh openings 49a may be oval or triangular, for example. In the configuration shown in FIG. 4 the multiple mesh openings 49a are arranged in a grid in the mesh 482, but the arrangement of the multiple mesh openings 49a is not limited to a grid pattern, and the mesh openings 49a may be arranged in any desired direction.

More specifically, the mesh openings 49a may be formed in any desirable shape, orientation, and pattern, but as shown in this embodiment of the invention, the mesh openings 49a are preferably multiple holes that are longer in the direction of the axis of rotation Y than the circumferential direction SH. This configuration enables the fiber contained in the first screened material SB, which is the separator feedstock to be separated, to pass more easily through the mesh openings 49a when the mesh drum 48 turns. As a result, fiber of the desired size can be extracted from the first screened material SB.

As shown in FIG. 3 and FIG. 5, the space inside the case 451A is separated into a first area A1 inside the mesh drum 48, and a second area A2 outside the mesh drum 48. The first area A1 and second area A2 are separated by the mesh 482 of the mesh drum 48, and air and particles able to pass through the mesh openings 49a in the mesh 482 can move between the first area A1 and second area A2.

The first opening 452A opens into the first area A1. As a result, the first screened material SB is supplied with the air current from the conduit 4A into the first area A1. Of the first screened material SB, the components that can pass through the mesh openings 49a moves into the second area A2. The components that can pass through the mesh openings 49a are minute particles, equivalent to the waste D described above. Of the first screened material SB, the components that cannot pass through the mesh openings 49a remain in the first area A1. The components that cannot pass through the mesh openings 49a are fibers larger than the size of the mesh openings 49a, for example, and correspond to the processing feedstock MC described above.

Therefore, when first screened material SB flows from the conduit 4A into the first opening 452A, the first screened material SB is screened by the mesh 482, components equivalent to waste D move into the second area A2, and components equivalent to processing feedstock MC remain inside the mesh drum 48. This state is the first state described above.

The processing feedstock MC that cannot pass through the mesh openings 49a in the mesh 482 and remains inside the mesh drum 48 may, as shown in FIG. 5, stick to the inside surface of the mesh drum 48 and accumulate. The processing feedstock MC may also accumulate on the inside bottom of the mesh drum 48, or float inside the first area A1. Most of the processing feedstock MC is conceivably pushed to the inside surface of the mesh 482 (inside surface of the mesh drum 48) by the air current flowing through the mesh 482 and the rotation of the mesh 482 in direction of rotation R, and clings to the inside surface of the mesh drum 48. A cleaning brush 459 (cleaner) that separates the processing feedstock MC from the inside surface of the mesh drum 48 is therefore disposed inside the mesh drum 48, that is, in the first area A1.

The cleaning brush 459 has numerous bristles that touch the inside surface of the mesh drum 48, that is, the mesh 482. When the mesh drum 48 turns in the direction of rotation R and the processing feedstock MC contacts the cleaning brush 459, the processing feedstock MC is wiped off the mesh 482 by the bristles of the cleaning brush 459. Note that the cleaning brush 459 may be configured with flexible protrusions instead of bristles.

The cleaning brush 459 may also be configured to rotate. The configuration whereby the case 451A removes processing feedstock MC from the mesh 482 is also not limited to using a cleaning brush 459. For example, a wiper (scraper) disposed near or in contact with the mesh 482 may be used instead of a cleaning brush 459. Both a cleaning brush 459 and a scraper (wiper) are both examples of a contact-type (wiping type) separation mechanism.

A contactless separation mechanism not having a member that touches the mesh 482 or processing feedstock MC may also be used instead of a cleaning brush 459. For example, a configuration that separates the processing feedstock MC from the mesh 482 by blowing a gas at a specific speed or greater across the mesh 482 from the first area A1 side, that is, from the axial direction of the mesh drum 48, may be used. More specifically, a nozzle that sprays high pressure gas (such as high pressure air, compressed nitrogen, a compressed inert gas) compressed to a pressure greater than atmospheric pressure may be used instead of a cleaning brush 459. In this case, the hose that supplies high pressure gas to the nozzle, and a gas tank or compressor, may be disposed to the separator 45.

When the processing feedstock MC accumulated in the mesh drum 48 is discharged from the case 451A, air flows in from the third opening 454A. The air flows through the conduit 6A into the case 451A, then flows from the second area A2 into the first area A1, and from the second opening 453A to the conduit 5A. The processing feedstock MC inside the mesh drum 48 is carried by this air current and discharged into the conduit 5A. This state is the second state described above.

As shown in FIG. 3 and FIG. 5, the second opening 453A is located below the first opening 452A on the vertical axis (Z direction) when the sheet manufacturing apparatus 100 is in use. The processing feedstock MC that does not pass through the mesh 482 and remains in the first area A1 moves to the bottom inside the mesh drum 48, and accumulates. Because the processing feedstock MC collects near the second opening 453A when the second opening 453A is below the first opening 452A, the processing feedstock MC can be easily recovered through the second opening 453A.

4. Configuration of Valves in the Separator

Figure 6:
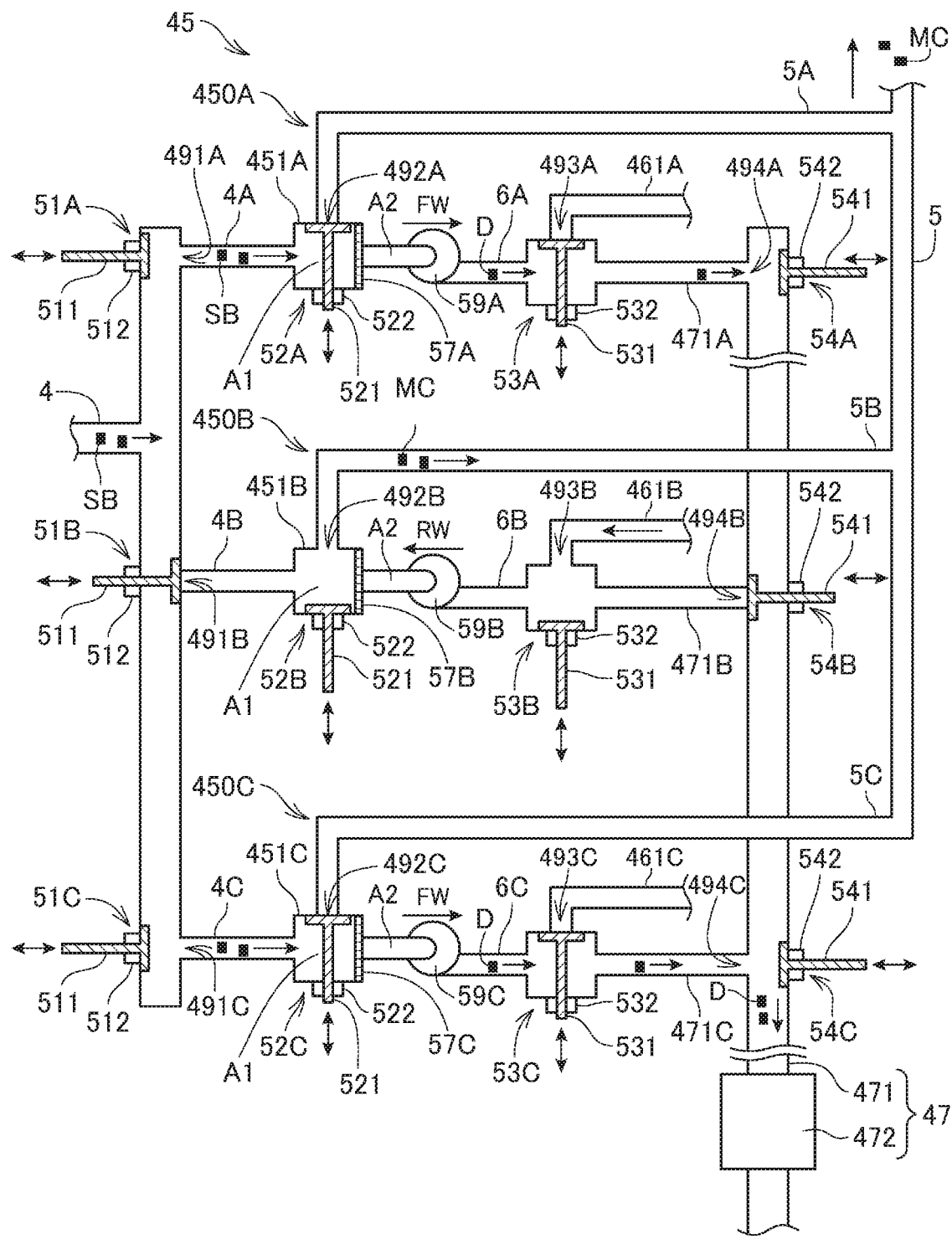
FIG. 6 schematically illustrates the configuration of the separator and the valve placement.

FIG. 6 illustrates the configuration and arrangement of valves in the separator 45.

The separator 45 has valves 51A, 52A, 53A, 54A, and air current generator 59A, as a configuration for changing the air current flowing through the subunit 450A. The separator 45 also has valves 51B, 52B, 53B, 54B, and air current generator 59B, as a configuration for changing the air current flowing through the subunit 450B. The separator 45 also has valves 51C, 52C, 53C, 54C, and air current generator 59C as a configuration for changing the air current flowing through the subunit 450C. Note that valves 51A-51C are collectively referred to as valve 51, valves 52A-52C as valve 52, valves 53A-53C as valve 53, and valves 54A-54C as valve 54. Likewise, air current generators 59A, 59B, 59C are collectively referred to as air current generator 59 (air current generator). In addition, valves 51A-51C (valve 51) is an example of a first control valve, and valves 52A-52C (valve 52) is an example of a second control valve.

The specific configuration of the valves 51A-51C, 52A-52C, 53A-53C, 54A-54C of the separator 45 may be determined as desired, and in this embodiment is preferably a motor operated valve or a solenoid valve that the controller 110 can control driving. Examples of motor operated valves having a motor that operates as controlled by the controller 110 and a valving element that is driven by the motor include butterfly valves, gate valves, globe valves, and ball valves. A solenoid valve has a solenoid that operates as controlled by the controller 110 and a valving element that is driven by the solenoid, and the valving element may be a spool, slide, or poppet valve.

As shown in FIG. 6, mesh 57A is disposed to the case 451A of the subunit 450A. This mesh 57A is a screen that passes the waste D and does not pass the processing feedstock MC in the first screened material SB flowing into the case 451A. The mesh 482 described above is an example of a this mesh 57A. In other words, mesh 57A schematically illustrates a configuration including mesh 482 as the configuration whereby the separator 45 separates the processing feedstock MC from the first screened material SB. Note that mesh 57A may be mesh 482, or it may be a different screen or comprise multiple screens. This also applies to mesh 57B disposed to case 451B, and mesh 57C disposed to case 451C. Mesh 57A, 57B, and 57C may also be configured differently.

The configuration shown in FIG. 6 has an air current generator 59A disposed between mesh 57A and conduit 6A. The air current generator 59A schematically illustrates a device that produces an air current in the area including conduit 6A and the case 451A, and the configuration thereof is not specifically limited. More specifically, the air current generator 59A is a device that produces an air current from the conduit 6A to the case 451A, and an air current from the case 451A to the conduit 6A, and may be a single device or comprise multiple devices. More specifically, examples of the air current generator 59A include the supply blower 462 and collection blower 473, and may include the mixing blower 56.

Air current generators 59B, 59C, like air current generator 59A, are disposed between mesh 57B, 57C and conduit 6B, 6C, and produce an air current through the areas including conduit 6B, 6C and case 451B, 451C, respectively. Air current generators 59B, 59C are devices that produce an air current from the conduit 6B, 5C to the case 451B, 451C, and an air current from the case 451B, 451C to the conduit 6B, 5C, and may be a single device or comprise multiple devices. More specifically, examples of the air current generators 59B, 59C include the supply blower 462 and collection blower 473, and may include the mixing blower 56. In other words, air current generators 59A, 59B, 59C have a common configuration.

Below, the direction of the air currents produced by air current generators 59A, 59B, 59C are referred to as first direction FW and second direction RW. The first direction FW indicates the direction from the case 451A, 451B, 451C through the conduit 6A, 6B, 6C to conduit 471. The second direction RW is the opposite direction as the first direction FW. In other words, the second direction RW is the direction from conduit 461A, 461B, 461C through conduit 6A, 6B, 6C to case 451A, 451B, 451C.

Valve 51A is a control valve that opens and closes the channel 491A from conduit 4 to conduit 4A. Channel 491A is a path through which air current and waste D flow. Valve 51A includes a valving element 511, and a driver 512 that moves the valving element 511 to a closed position closing the channel 491A, or an open position enabling flow through the channel 491A. In this example the valving element 511 is a poppet-style valving element, and by the operation of a driver 512 including a solenoid moves perpendicularly to a valve seat formed in the channel 491A. The valve 51A may be configured with an urging member such as a spring that urges the valving element 511 in resistance to the force of the driver 512.

Valve 51B is a control valve that opens and closes the channel 491B from conduit 4 to conduit 4B. Valve 51C is a control valve that opens and closes the channel 491C from conduit 4 to conduit 4C. Valves 51B, 51C each have a valving element 511 and a driver 512, and are configured and operate the same as valve 51A.

Valve 52A is a control valve that opens and closes the channel 492A from case 451A to conduit 5A. Valve 52A includes a valving element 521, and a driver 522 that moves the valving element 521 to a closed position closing the channel 492A, or an open position enabling flow through the channel 492A, and in this example is a poppet-style solenoid valve. The valve 52A may be configured with an urging member such as a spring that urges the valving element 521 in resistance to the force of the driver 522.

Valve 52B is a control valve that opens and closes the channel 492B from case 451B to conduit 5B. Valve 52C is a control valve that opens and closes the channel 492C from case 451C to conduit 5C. Valves 52B, 52C each have a valving element 521 and a driver 522, and are configured and operate the same as valve 52A.

Valve 53A is a control valve that opens and closes the channel 493A from case 451A to conduit 5A. Valve 53A includes a valving element 531, and a driver 532 that moves the valving element 531 to a closed position closing the channel 493A, or an open position enabling flow through the channel 493A, and in this example is a poppet-style solenoid valve. The valve 53A may be configured with an urging member such as a spring that urges the valving element 531 in resistance to the force of the driver 532.

Valve 53B is a control valve that opens and closes the channel 493B from conduit 6B to conduit 461B. Valve 53C is a control valve that opens and closes the channel 493C from conduit 6C to conduit 461C. Valves 53B, 53C each have a valving element 531 and a driver 532, and are configured and operate the same as valve 53A.

Valve 54A is a control valve that opens and closes the channel 494A from conduit 471 to conduit 471A. Valve 54A includes a valving element 541, and a driver 542 that moves the valving element 541 to a closed position closing the channel 494A, or an open position enabling flow through the channel 494A, and in this example is a poppet-style solenoid valve. The valve 54A may be configured with an urging member such as a spring that urges the valving element 541 in resistance to the force of the driver 542.

Valve 54B is a control valve that opens and closes the channel 494B from conduit 471 to conduit 471B. Valve 54C is a control valve that opens and closes the channel 494C from conduit 471C to conduit 471C. Valves 54B, 54C each have a valving element 541 and a driver 542, and are configured and operate the same as valve 54A.

The controller 110 independently controls and sets the subunits 450A, 450B, 450C to the first state or second state. In the configuration shown in FIG. 6, subunits 450A, 450C are set to the first state, and subunit 450B is set to the second state.

Because valve 51A of subunit 450A is open in the state shown in FIG. 6, air current flows from conduit 4 through conduit 4A into the case 451A. Because valves 52A, 53A are closed, the air current generator 59A generates an air flow in the first direction FW, and air flows from case 451A through conduit 6A to conduit 471.

In this state, the first screened material SB is separated by the mesh 57A into waste D and processing feedstock MC, and the waste D is discharged with the air current to the conduit 471. The air current from case 451A to conduit 5A, and from conduit 461A through conduit 6A to the case 451A, does not flow.

This is the same for subunit 450C shown in FIG. 6.

However, because valve 51B of subunit 450B in FIG. 6 is closed, air does not flow from conduit 4B to case 451B. In addition, because valve 54B is closed, air does not flow from case 451B to conduit 6B (conduit 471). Because in subunit 450B valve 53B is open and valve 52B is open, air flows in second direction RW from conduit 461B through conduit 6B. This air current passes through mesh 57B and flows from case 451B through conduit 5B into conduit 5.

In this state, the processing feedstock MC separated by the mesh 57B is supplied by the air current to the conduit 5.

More specifically, subunits 450A, 450B, 450C are in the first state when valves 51A-51C, and valves 54A-54C are open, valves 52A-52C, and valves 53A-53C are closed, and air current generators 59A, 59B, 59C produce an air current flowing in the first direction FW. Conversely, when valves 51A-51C, and valves 54A-54C are closed, and valves 52A-52C and valves 53A-53C are open, and air current generators 59A, 59B, 59C produce an air current flowing in the second direction RW, the subunits 450A, 450B, 450C are in the second state.

Each subunit 450A-450C can separate the first screened material SB into waste D and processing feedstock MC, but the processing feedstock MC accumulates in the first area A1. By switching subunits 450A-450C at the appropriate timing between the first state and second state, the processing feedstock MC accumulated in the first area A1 can be extracted and conveyed to the mixing device 50 (recovery unit).

By appropriately controlling subunits 450A-450C, the separator 45 can operate to separate and discharge waste D from the first screened material SB, and supply processing feedstock MC to the mixing device 50.

5. Configuration of the Control System of the Sheet Manufacturing Apparatus

Figure 7:
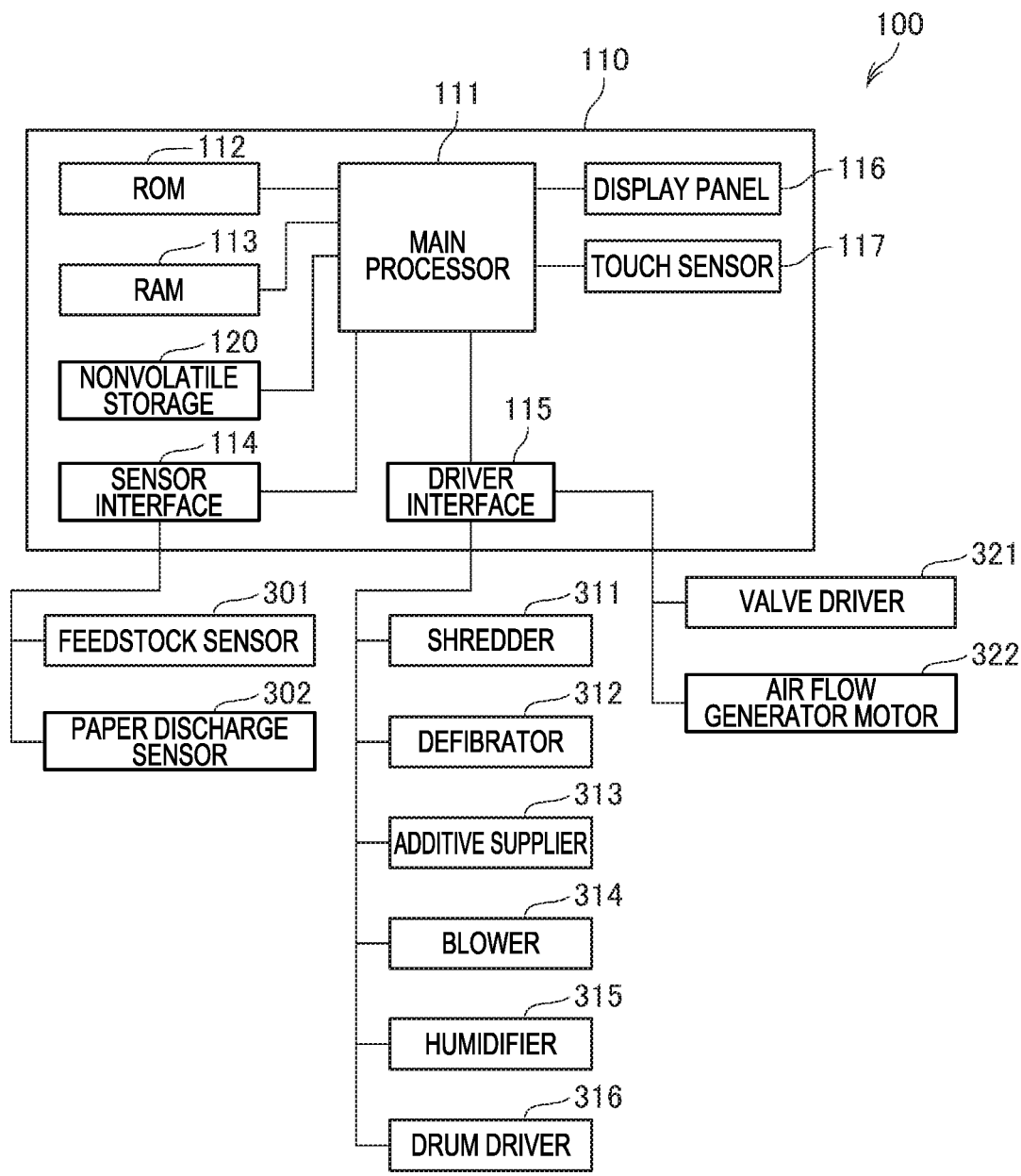
FIG. 7 is a block diagram of the control system of the sheet manufacturing apparatus.

FIG. 7 is a block diagram of the control system of the sheet manufacturing apparatus 100.

The sheet manufacturing apparatus 100 has a controller 110 that has a main processor 111 configured to control parts of the sheet manufacturing apparatus 100.

The controller 110 has a main processor 111, ROM (Read Only Memory) 112, and RAM (Random Access Memory) 113.

The main processor 111 is embodied by a processor such as a CPU (central processing unit), and controls parts of the sheet manufacturing apparatus 100 by running a basic control program stored in ROM 112. The main processor 111 may also be configured as a system chip including ROM 112, RAM 113, or other peripheral circuits, or other IP cores.

ROM 112 nonvolatilely stores programs executed by the main processor 111.

RAM 113 provides working memory used by the main processor 111, and temporarily stores programs the main processor 111 runs and data that is processed.

Nonvolatile storage 120 stores programs the main processor 111 executes, and data the main processor 111 processes.

The display panel 116 is an LCD or other type of display panel, and in this example is disposed externally to the sheet manufacturing apparatus 100. The display panel 116 displays the operating status of the sheet manufacturing apparatus 100, various settings, and warnings, for example.

The touch sensor 117 is a touch or pressure sensitive sensor. In this example, the touch sensor 117 is disposed over the display surface of the display panel 116, and detects operations on the display panel 116. In response to operations, the touch sensor 117 outputs to the main processor 111 operating data including the operating position and the number of operating positions. Based on output from the touch sensor 117, the main processor 111 detects operation of the display panel 116, and acquires the operating positions. The main processor 111 enables GUI (graphical user interface) operations based on the operating position detected by the touch sensor 117, and the display data 122 that was displayed on the display panel 116 when the operation was detected.

The controller 110 is connected through a sensor interface 114 to sensors disposed to parts of the sheet manufacturing apparatus 100. The sensor interface 114 is an interface that acquires detection values output by the sensors, and inputs to the main processor 111. The sensor interface 114 may include an A/D converter that converts analog signals output by the sensors to digital data. The sensor interface 114 may also supply drive current to the sensors. The sensor interface 114 may also include circuits that acquire sensor output values according to the sampling frequency controlled by the main processor 111, and output to the main processor 111.

The sensor interface 114 is also connected to a feedstock sensor 301, and a paper discharge sensor 302, for example.

The feedstock sensor 301 detects the remaining amount of feedstock MA in the supply device 10. The feedstock sensor 301 in this example is an optical sensor that detects when the feedstock MA reaches specific position in the supply device 10. When the controller 110 determines that the amount of feedstock MA detected by the feedstock sensor 301 is greater than or equal to a set amount, the controller 110 reports by displaying on the display panel 116.

The paper discharge sensor driver 302 detects how many sheets S are stored in the tray or stacker of the tray 96. The controller 110 reports by displaying on the display panel 116 when the volume of sheets S detected by the paper discharge sensor 302 is greater than or equal to a specific setting.

The controller 110 is connected to the drivers of the sheet manufacturing apparatus 100 through a driver interface 115. The drivers of the sheet manufacturing apparatus 100 include motors, pumps, and heaters, for example. The driver interface 115 may be a configuration directly connected to a motor, or connected to a drive circuit or drive chip (IC chip) that supplies drive current to a motor.

A shredder 311, defibrator 312, additive supplier 313, blower 314, humidifier 315, and drum driver 316 are connected to the driver interface 115 as control objects of the controller 110.

The shredder 311 in this example is a motor for turning the shredder blades 14.

The defibrator 312 includes a motor or other drive device for turning the rotor (not shown in the figure) of the defibrator 20.

The additive supplier 313 includes drivers such as a motor that drives a screw feeder for supplying additive from the additive injector 66c, and a motor or actuator that opens and closes the shutters of the additive injector 66c.

The blowers 314 include the defibrator blower 26, mixing blower 56, and suction blower 77. These blowers may individually connect to the driver interface 115.

The drum driver 316 includes drivers such as a motor for turning drum 41, and a motor for turning drum 61.

A motor for driving the calender rolls 85, and a heater for heating the heat rollers 86, may also be connected to the driver interface 115. A water pump for supply water to the humidifiers may also be connected to the driver interface 115.

A valve driver 321 and air flow generator motor 322 also connect to the driver interface 115.

The valve driver 321 is the driver that operates valves 51A-51C, 52A-52C, 53A-53C, 54A-54C to open and close as controlled by the controller 110. The valve driver 321 in this example includes drivers 512, 522, 532, and 542. When the valves 51A-51C, 52A-52C, 53A-53C, 54A-54C of the separator 45 are motor operated valves, for example, the valve driver 321 is a motor (not shown in the figure) that opens and closes the motor operated valves.

The air flow generator motor 322 is one or multiple motors that produces first direction FW and second direction RW air currents in the subunits 450A, 450B, 450C as controlled by the controller 110. The air flow generator motor 322 is an example of a motor that drives the air current generators 59A, 59B, 59C. More specifically, the air flow generator motor 322 in this example includes the supply blower 462 and collection blower 473. The air flow generator motor 322 may also include one or more motors for operating other blowers.

In this configuration, the controller 110 controls parts of the sheet manufacturing apparatus 100 and controls the operation of making sheets S from feedstock MA by means of the main processor 111 executing a program.

6. Sheet Manufacturing Apparatus Operation

Figure 8:
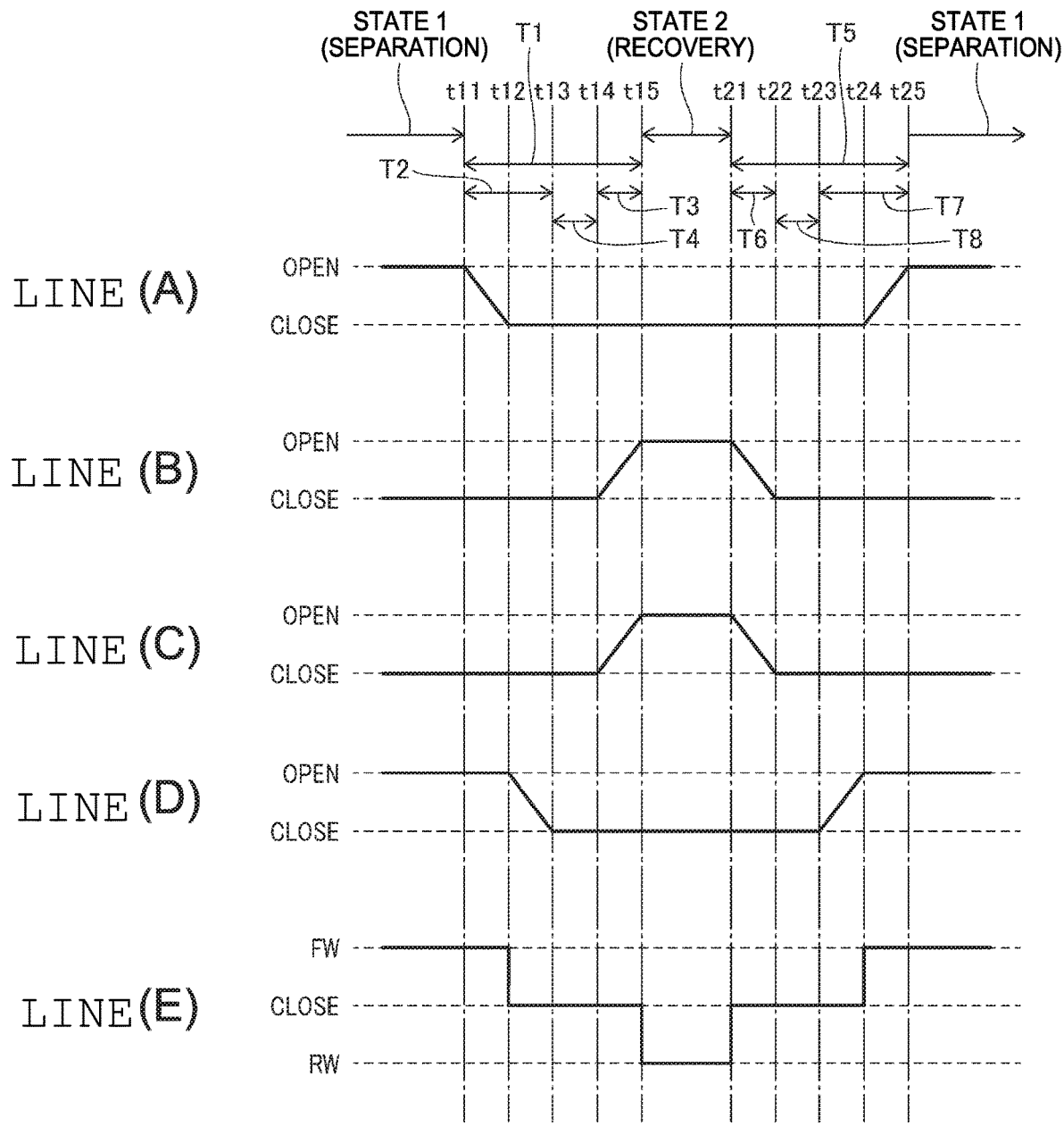
FIG. 8 is a timing chart of subunit operation.

FIG. 8 is a timing chart of the operation of subunit 450A. How the controller 110 controls changing the operating state of the subunit 450A to the first state and the second state is described with reference to FIG. 8. Note that FIG. 8 describes the controller 110 controlling subunit 450A. Control of subunits 450B, 450C is the same as controlling subunit 450A, and further description thereof is omitted.

In FIG. 8, the open/closed state of valve 51A is shown in line (A), the open/closed state of valve 52A is shown in (B), the open/closed state of valve 53A is shown in (C), and the open/closed state of valve 54A is shown in (D). The direction of the air current produced by air current generator 59A is shown in (E).

Subunit 450A is in the first state until time t11 in FIG. 8. In the first state, valve 51A and valve 54A are open, valve 52A and valve 53A are closed, and the air current generator 59A produces an air flow in the first direction FW.

In the operation shown in FIG. 8, the controller 110 controls the valve driver 321 and air flow generator motor 322, and starts the operation changing (transitioning, moving) the subunit 450A from the first state to the second state. From time t11. The controller 110 moves valve 51A to the closed position from time t11. After valve 51A is completely closed, the controller 110 moves valve 54A to closed from time t12. After valve 51A is completely closed, the controller 110 stops the air current of the air current generator 59A. At time t13 when valve 54A becomes completely closed, subunit 450A is in a paused state.

Then at time t14, the controller 110 moves valve 52A and valve 53A to the open position. When valve 52A and valve 53A are open, the controller 110 drives the air current generator 59A to produce an air current in the second direction RW from time t15. As a result, the subunit 450A operates in the second state.

The process T1 (time t11-t15) changing the subunit 450A from the first state to the second state includes the shutoff process T2 (time t11-t13) of closing valves 51A, 54A, and the opening process T3 (time t14-t15) of opening valves 52A, 53A. Period T4 (time t13-t14) is when the subunit 450A is paused, the length of this period may be set as desired, and the controller 110 may set length of period T4 to zero.

In the shutoff process T2, the controller 110 may close valve 51A, close valve 54A, and stop the air current generator 59A simultaneously. However, when the controller 110 first closes v51a, and then closes valve 54A and stops the air current generator 59A at time t12 as shown in FIG. 8, the amount of waste D in the subunit 450A, including the case 451A, can be reduced. As a result, in the second state, the amount of waste D moved by the air current in the second direction RW from the second area A2 to the first area A1 can be suppressed, and waste D mixing with the processing feedstock MC can be suppressed.

At time t21 in FIG. 8, the subunit 450A is in the second state, valve 51A and valve 54A are closed, valve 52A and valve 53A are open, and the air current generator 59A produces an air current in the second direction RW.

The controller 110 starts the operation of changing the subunit 450A from the second state to the first state from time t21. The controller 110 first closes valves 52A, 53A at (time t21). When valves 52A, 53A are completely closed (time t22), subunit 450A is in a paused state.

The controller 110 then opens valve 54A at time t23. After valve 54A opens (time t24), the controller 110 moves valve 51A to the open position, and the air current generator 59A therefore starts producing an air current in the first direction FW.

The process T5 (time t21-t25) of changing the subunit 450A from the second state to the first state includes the shutoff process T6 (time t21-t22) of closing valves 52A, 53A, and the opening process T7 (time t23-t25) of opening valves 51A, 54A. Period T8 (time t22-t23) is the period when the subunit 450A is paused, the length of this period may be set as desired, and the controller 110 may set length of period T8 to zero.

By starting the operation opening valve 51A and the operation of the air current generator 59A at the same time in the opening process T7, the controller 110 can more quickly discharge the waste D component of the first screened material SB supplied to the case 451A into the conduit 471. As a result, accumulation of waste D inside the case 451A can be avoided, and waste D mixing with the processing feedstock MC can be suppressed.

Figure 9:
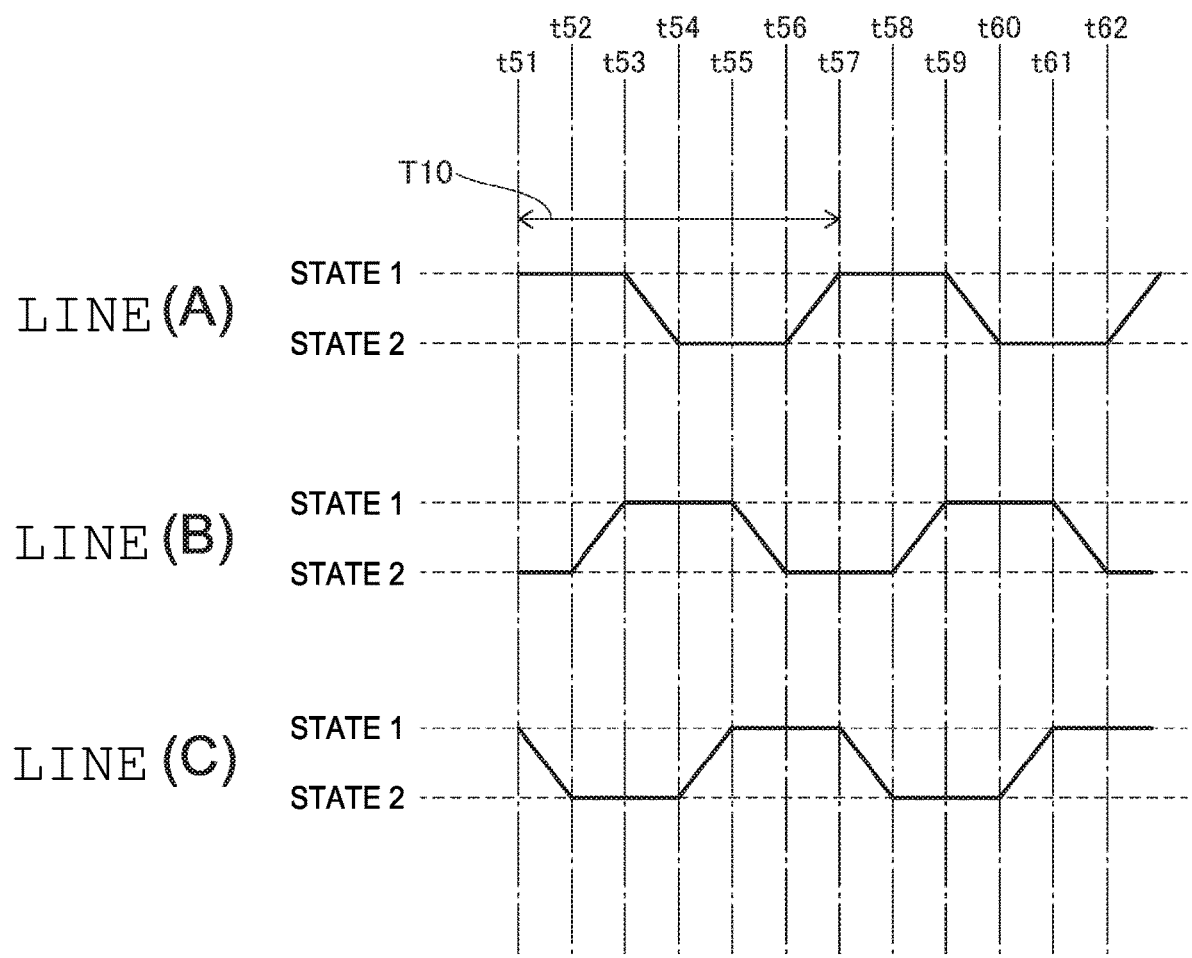
FIG. 9 is a timing chart of separator operation.

FIG. 9 is a timing chart of the operation of the separator 45.

In FIG. 9, the operating state of the subunit 450A is shown in line (A), the operating state of subunit 450B in (B), and the operating state of subunit 450C in (C).

In FIG. 9, at time t51, subunits 450A, 450C are in the first state, and subunit 450B is in the second state. The operating state of the separator 45 at time t51 is the state shown in FIG. 6.

As shown in line (A) of FIG. 9, the controller 110, from time t51-t53, holds subunit 450A in the first state, and moves it to the second state from time t53-t54. From time t53-t54, the controller 110 changes the operating state of subunit 450A as described in process T1 in FIG. 8. Next, the controller 110, from time t54-t56, holds subunit 450A in the second state, and from time t56-t57 moves it to the first state. From time t56-t57, the subunit 450A changes state as described in process T5 in FIG. 8 as controlled by the controller 110.

The controller 110 controls switching subunits 450B, 450C to the first state and second state at the same cycle as subunit 450A.

The controller 110 also controls the timing of the state changes of the subunits 450A, 450B, 450C to be offset by a specific time.

One cycle, which is the unit of subunit 450A operation, is from time t51-t57 in this example. This cycle T10 includes the first state, the second state, a transition from the first state to the second state, and a transition from the second state to the first state.

The cycle corresponding to cycle T10 in the operation of subunit 450B is time t53-t59, and the in the operation of subunit 450C from time t55-t61.

In other words, the controller 110 controls the cycle of the operation of the subunits 450A, 450B, 450C to be offset ⅓ cycle. As a result, when the separator 45 is operating, one subunit 450 of the three subunits 450A, 450B, 450C is always in the first state, one subunit 450 is always in the second state, and the operating state of the remaining subunit 450 is in transition.

The capacity of the separator 45 to separate the first screened material SB corresponds to the number of subunits 450 operating in the first state. The capacity of the separator 45 to supply processing feedstock MC to the mixing device 50 corresponds to the number of subunits 450 operating in the second state. In the example shown in FIG. 9, the number of subunits 450 operating in the first state and second state is fixed at one each. As a result, the first screened material SB the classifier 40 separates can be consistently processed, and a stable supply of processing feedstock MC to the mixing device 50 can be maintained.

For example, problems such as undesirable accumulation of defibrated material in the classifier 40 and the defibrator 20 located upstream therefrom due to variation in the capacity of the separator 45 to process first screened material SB can be avoided. In addition, by stabilizing the amount of processing feedstock MC supplied to the mixing device 50, color variations in the mixing device 50, and variation in the thickness of the web W formed by the web former 70, can be prevented, and the quality of the resulting sheets S can be improved.

As described above, the sheet manufacturing apparatus 100 according to the first embodiment of the invention has a separator 45. The separator 45 has subunits 450. Each subunit 450 has a mesh drum 48 configured as a rotatable cylinder with mesh 482 in at least part of its surface, and a case 451 that houses the mesh drum 48. The case 451 has a first opening 452 and a second opening 453 that communicate with first area A1, which is inside the mesh drum 48, and a third opening 454 that communicates with a second area A2 outside the mesh drum 48. First screened material SB containing fiber is supplied from the first opening 452 to the first area A1. The subunit 450 discharges waste D, which is a first component of the first screened material SB, from the third opening 454 by an air current that carries and moves the waste D through the mesh drum 48 from the first area A1 to the second area A2. By the flow of air, the subunit 450 discharges from the second opening 453 processing feedstock MC, which is a second component of the first screened material SB that does not pass through the mesh drum 48 and remains in the first area A1.

The sheet manufacturing apparatus 100 changes the air current in the subunit 450 between a flow through the case 451 from the first opening 452 to the third opening 454, and a flow to the second opening 453. By changing the flow of air, the separator 45 can separate the waste D that passes through the mesh 482 of the mesh drum 48, from the processing feedstock MC that does not pass through the mesh 482. Furthermore, because the mesh drum 48 is a rotatable cylinder, the processing feedstock MC can be dispersed by turning the mesh drum 48. This prevents a drop in the separation efficiency due to uneven distribution of the processing feedstock MC. The components of the first screened material SB can therefore be efficiently separated by the mesh 482, and fiber can be extracted.

The mesh 482 has numerous mesh openings 49*a* that are longer in the direction of the axis of rotation than the circumferential direction. Because the openings in the mesh 482 are shaped to allow the fiber contained in the first screened material SB to pass through with appropriate ease when the mesh drum 48 turns, fiber of the desirable size can be extracted from the first screened material SB.

The subunit 450 also has a cleaning brush 459 in the first area A1 to separate processing feedstock MC that has accumulated on the inside surface of the mesh drum 48 from the mesh drum 48. The cleaning brush 459 has the effect of wiping off processing feedstock MC that clings to the mesh 482. As a result, processing feedstock MC that does not pass through the mesh 482 and remains inside the mesh drum 48 can be reliably removed from the mesh drum 48 and more efficiently separated from the first screened material SB.

The second opening 453 is located vertically below the first opening 452 when the sheet manufacturing apparatus 100 is installed for operation. As a result, because processing feedstock MC that did not pass through the mesh 482 collects near the second opening 453, and the processing feedstock MC can be easily recovered from the second opening 453.

A mixing blower 56 that functions as a vacuum to suction the processing feedstock MC is also connected to the second opening 453. As a result, processing feedstock MC inside the mesh drum 48 can be quickly recovered from the second opening 453.

A defibrator blower 26 is also connected to the first opening 452 as a first air current generator that produces an air current from the first area A1 to the second area A2. The first air current generator may also be the collection blower 473. This enables supplying the first screened material SB with the air current to the first area A1, and more efficiently separating the first screened material SB into waste D and processing feedstock MC.

The collection blower 473 is also connected to the third opening 454 as a second air current generator that produces an air current from the first area A1 to the second area A2. Waste D that passes through the mesh 482 can therefore be removed by the air current quickly from the third opening 454 with the air current.

First screened material SB is supplied from the first opening 452 to the first area A1 of the subunit 450 by the air current. In a first state, the air current moves the waste D from the first area A1 to the second area A2 of the subunit 450 and discharges the waste D from the third opening 454 with the flow of air. In the second state, the processing feedstock MC component of the first screened material SB that does not pass through the mesh drum 48 and remains in the first area A1 is recovered by the air flow to the second opening 453. The subunit 450 switches between the first state and second state. Because the direction of the air flow is different in the first state and second state, first screened material SB introduced to the mesh drum 48 can be separated into waste D and processing feedstock MC, and the waste D and processing feedstock MC can be separately recovered.

The sheet manufacturing apparatus 100 has a defibrator 20 that defibrates feedstock MA containing fiber, and a recycling unit 102 that processes the defibrated material output by the defibrator 20. The sheet manufacturing apparatus 100 also has, as conveyors that convey the defibrated material by a conveyance air current from the defibrator 20 to the recycling unit 102, a defibrator blower 26, classifier 40, separator 45, and mixing blower 56.

The separator 45 disposed to the conveyor has a subunit 450. The subunit 450 has a mesh drum 48 configured as a rotatable cylinder with mesh 482 in at least part of its surface, and a case 451 that houses the mesh drum 48. The case 451 has a first opening 452 and a second opening 453 that communicate with first area A1, which is inside the mesh drum 48, and a third opening 454 that communicates with a second area A2 outside the mesh drum 48. First screened material SB containing fiber is supplied from the first opening 452 to the first area A1. The subunit 450 discharges waste D in the first screened material SB from the third opening 454 by an air current that carries and moves the waste D through the mesh drum 48 from the first area A1 to the second area A2. The subunit 450 also discharges by the flow of air processing feedstock MC in the first screened material SB that does not pass through the mesh drum 48 and remains in the first area A1 from the second opening 453.

By thus separating defibrated material conveyed from the defibrator 20 in the mesh drum 48, and supplying the processing feedstock MC that does not pass through the mesh 482 to the recycling unit 102, fiber contained in the feedstock MA can be extracted and processed. In addition, separator 45 also changes the air current in the mesh drum 48 between a flow from the first opening 452 to the third opening 454, and a flow to the second opening 453. By changing the flow of air, the separator 45 can separate the waste D that passes through the mesh 482 of the mesh drum 48, from the processing feedstock MC that does not pass through the mesh 482. Furthermore, because the mesh drum 48 is a rotatable cylinder, the processing feedstock MC can be dispersed by turning the mesh drum 48. This prevents a drop in the separation efficiency due to uneven distribution of the processing feedstock MC. The components of the defibrated material can therefore be efficiently separated by the mesh 482, fiber can be extracted, and fiber can be processed more efficiently.

The sheet manufacturing apparatus 100 also has a separator 45. The separator 45 has a subunit 450. The subunit 450 has a mesh drum 48 configured as a rotatable cylinder with mesh 482 in at least part of its surface. The subunit 450 also has a case 451 that has a first opening 452 and a second opening 453 that communicate with a first area A1 that is the inside of the mesh drum 48, and a third opening 454 that communicates with a second area A2 that is outside the mesh drum 48. The separator 45 also has an air current generator 59 that produces an air flow in the case 451.

The sheet manufacturing apparatus 100 also has a controller 110 that changes the operating state of the air current generator 59 between a first state producing an air flow from the first area A1 to the second area A2, and a second state producing an air flow from the second area A2 to the first area A1. In the first state, the sheet manufacturing apparatus 100 supplies first screened material SB to the mesh drum 48 from the first opening 452. As a result, the first screened material SB can be separated into components that pass through the mesh 482 and components that do not pass through, and the components that pass through the mesh 482 can be recovered from the third opening 454. In the second state, components that did not pass through the mesh 482 can be recovered from the second opening 453. As a result, first screened material SB can be supplied to the inside of the mesh drum 48, and components that pass through the mesh 482 and components that do not pass through the mesh 482 can be efficiently separated.

A classifier 40 is connected to the first opening 452 as a supplier that supplies first screened material SB containing fiber to the first area A1. A mixing blower 56 is also connected to the separator 45 as a recovery device that recovers, by the air flow from the first area A1 to the second area A2, processing feedstock MC that did not move from the first area A1 to the second area A2.

The separator 45 has a subunit 450. The subunit 450 has a valve 51 disposed between the first opening 452 and classifier 40, and switches between a state in which first screened material SB can be supplied from the classifier 40 to the first opening 452, and a state in which first screened material SB cannot be supplied. The subunit 450 also has a valve 52 disposed between the first opening 452 and mixing blower 56, and switches between a state in which processing feedstock MC can be recovered by the mixing blower 56 from the second opening 453, and a state in which processing feedstock MC cannot be recovered.

The controller 110 changes the state of valve 51 and valve 52 to switch between the first state and second state. By opening and closing valve 51 and valve 52, first screened material SB can be supplied to the mesh drum 48 and the components separated by the mesh drum 48 can be recovered. As a result, first screened material SB can be efficiently separated by controlling valve 51 and valve 52.

The separator 45 also has a subunit 450A and a subunit 450B. In a first operating mode (first mode), the controller 110 sets the state of the air current generator 59 to subunit 450A to the first state, and sets the state of the air current generator 59 to subunit 450B to the second state. In a second operating mode (second mode), the controller 110 sets the state of the air current generator 59 to subunit 450A to the second state, and sets the state of the air current generator 59 to subunit 450B to the first state. The controller 110 repeatedly moves between the first mode and the second mode. As a result, subunits 450A and 450B are alternately switched between the first state supplying first screened material SB and recovering waste D, and a second state recovering processing feedstock MC. As a result, the sheet manufacturing apparatus 100 can continuously separate first screened material SB by the separator 45, and can more efficiently extract fiber from the first screened material SB.

The separator 45 also has a subunit 450A as a first separator, a subunit 450B as a second separator, and a subunit 450C as a third separator. The controller 110 controls the subunits 450A, 450B, 450C so that one is in the first state, one is in the second state, and the other is in transition from the first state to the second state or from the second state to the first state. As a result, the separator 45 can balance the capacity of the subunits 450A, 450B, 450C to process first screened material SB with the capacity of the subunits 450A, 450B, 450C to supply processing feedstock MC to the mixing blower 56.

7. Embodiment 2

Figure 10:
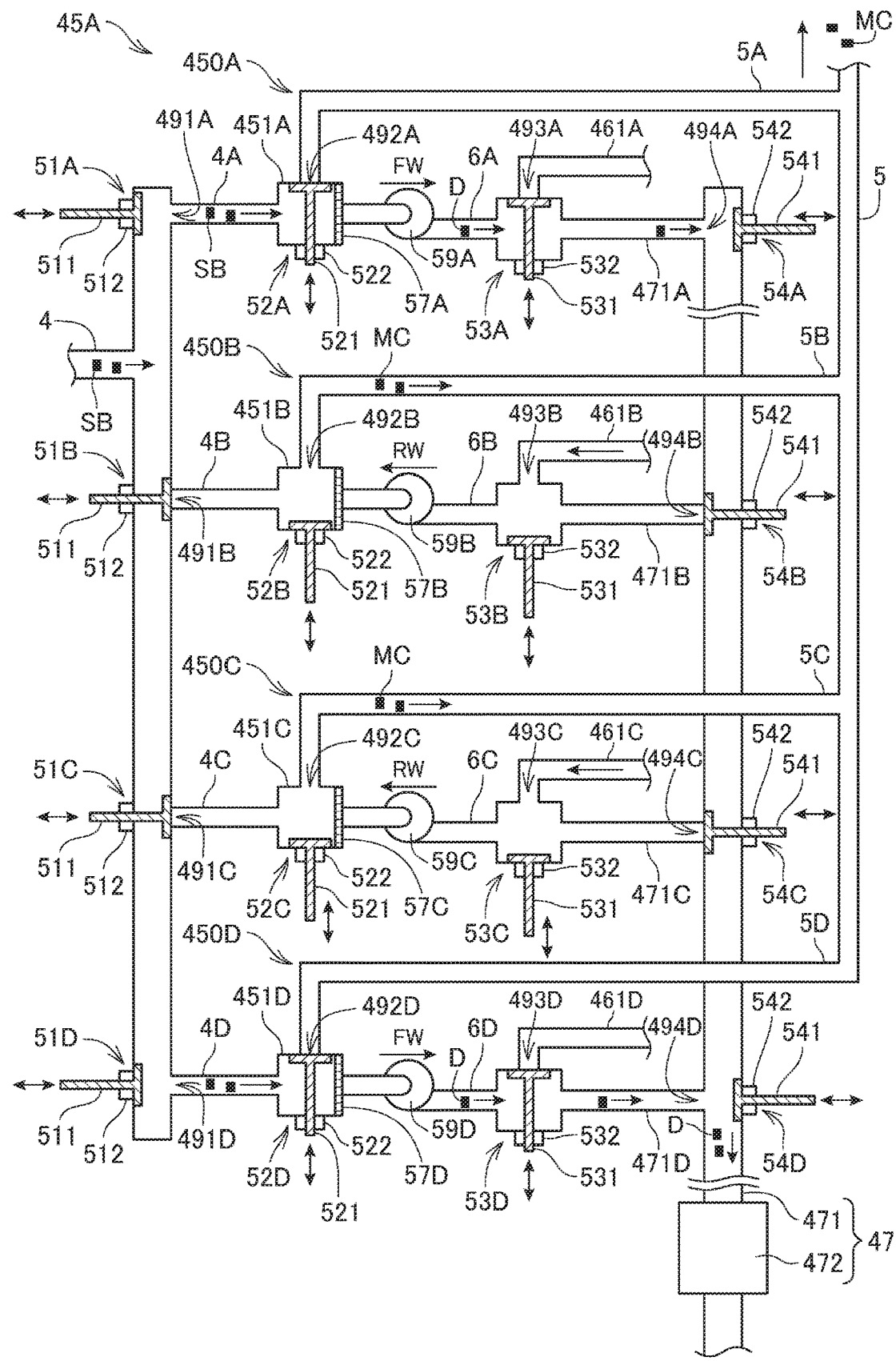
FIG. 10 schematically illustrates the configuration of the separator and the valve placement in a second embodiment of the invention.

FIG. 10 schematically illustrates the configuration of the separator and the placement of valves in a second embodiment of the invention.

The separator 45A according to the second embodiment of the invention may be used in the sheet manufacturing apparatus 100 instead of the separator 45 according to the first embodiment of the invention.

Separator 45A also has a subunit 450D in addition to the subunits 450A, 450B, 450C of the separator 45 described above. Other aspects of the separator 45A are the same as the separator 45 described above, and further description thereof is omitted below and in the figures.

Subunit 450D has the same components inside case 451D as subunit 450A described above. Subunit 450D has valves 51D, 52D, 53D, 54D, which are configured identically to the valves 51A, 52A, 53A, 54A of subunit 450A. Subunit 450D also has an air current generator 59D configured identically to air current generator 59A described above.

The drivers 512, 522, 532, 542 of subunit 450D are controlled by the controller 110 the same as valve driver 321 shown in FIG. 7, and the air current generator 59D is controlled the same as air flow generator motor 322 shown in FIG. 7.

Figure 11:
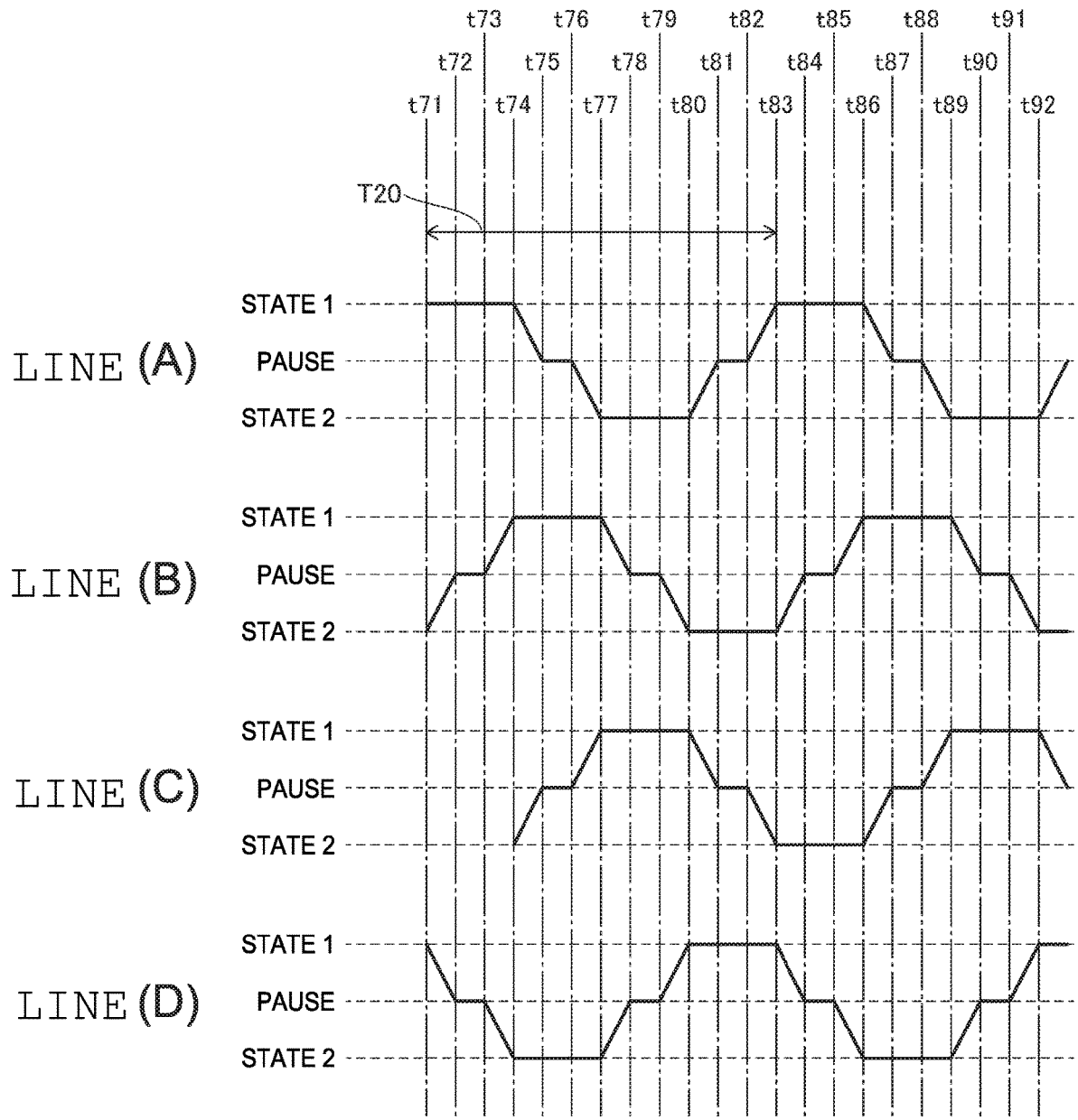
FIG. 11 is a timing chart of separator operation in the second embodiment of the invention.

FIG. 11 is a timing chart of the operation of separator 45A in this embodiment.

In FIG. 11 the operating state of the subunit 450A is shown in line (A), the operating state of subunit 450B in (B), the operating state of subunit 450C in (C), and the operating state of subunit 450D in (D).

As shown in line (A) of FIG. 11, the controller 110, from time t71-t74, holds subunit 450A in the first state, and from time t74-t77 moves it to the second state. From time t74-t77, the controller 110 controls changing the state of the subunit 450A as shown in process T1 in FIG. 8. From time t75-t76 is the same as the pause period T4 in process T1 in FIG. 8. The controller 110 then holds the subunit 450A in the second state from time t77-t80, and from time t80-t83 moves it to the first state. From time t80-t83, the subunit 450A changes state as shown in process T5 in FIG. 8 as controlled by the controller 110. From time t81-t82 is the same as the pause period T8 in process T5 in FIG. 8.

The controller 110 controls repeatedly switching subunits 450B, 450C, 450D between the first state and second state on the same cycle as subunit 450A.

The controller 110 also controls the timing of the state changes of the subunits 450A, 450B, 450C, 450D to be offset by a specific time.

One cycle, which is the unit of subunit 450A operation, is period T20 from time t71-t83 in this example. This cycle T20 includes the first state and the second state, changing from the first state to the second state, and changing from the second state to the first state.

The cycle corresponding to cycle T20 in the operation of subunit 450B is time t74-t86, from time t77-t89 in the operation of subunit 450C, and from time t79 in the operation of subunit 450D.

In other words, the controller 110 controls the operating cycles of the subunits 450A, 450B, 450C, 450D to be offset ¼ cycle. As a result, when the separator 45 is operating, one subunit 450 of the four subunits 450A, 450B, 450C, 450D is always in the first state, one subunit 450 is always in the second state, and the operating state of the other two subunits 450 is in transition.

The controller 110 can balance the capacity of the separator 45 to process first screened material SB with the ability to supply processing feedstock MC to the mixing device 50 as done by adjusting the operation of subunits 450A to 450C in the first embodiment.

8. Embodiment 3

Figure 12:
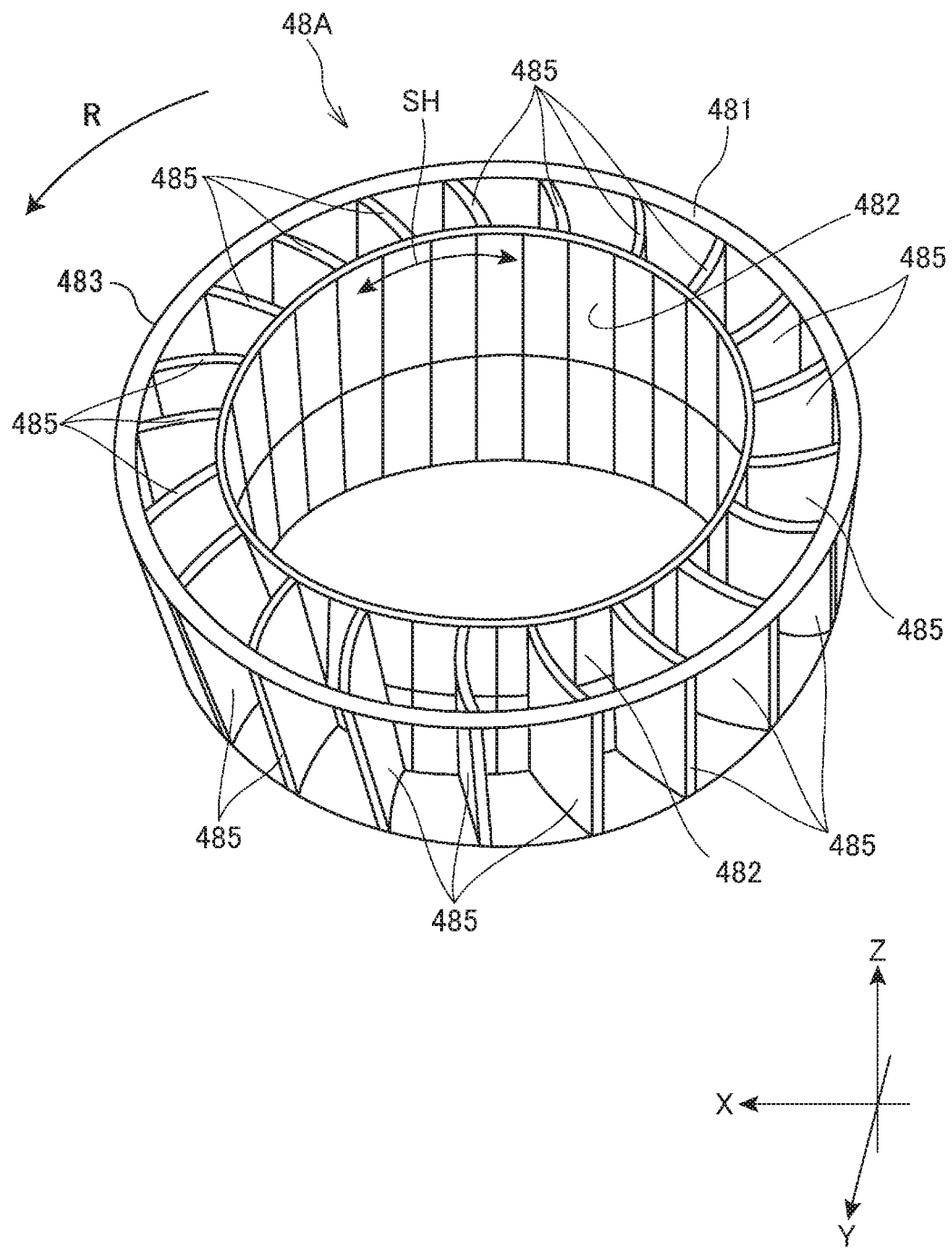
FIG. 12 is an oblique view of the mesh drum in a third embodiment of the invention.

FIG. 12 is an oblique view of the mesh drum 48A in a third embodiment of the invention.

The mesh drum 48A according to the third embodiment of the invention is used in the separator 45 instead of the mesh drum 48 described in the first embodiment.

Other than the configuration of the mesh drum 48A shown in FIG. 12, the separator 45 is configured as described above, and further description thereof is omitted below and in the figures.

As shown in FIG. 12, the mesh drum 48A has multiple fan blades 485 (blades) disposed in the circumferential direction SH to a drum 481. Each fan blade 485 is a panel member that curves in the radial direction of the mesh drum 48 to the outside surface 483. Mesh 482 is disposed on the inside surface side of the mesh drum 48A.

The separator 45 has this mesh drum 48A housed inside the case 451 instead of the mesh drum 48 shown in FIG. 3, causes the mesh drum 48A to rotate in the direction of arrow R, and separates the waste D from the first screened material SB. As the mesh drum 48A turns, the fan blades 485 also produce an air current in the direction moving away from the outside surface 483. Production of this air current also produces an air flow in the mesh drum 48A moving from the mesh 482 to the outside surface 483. As a result, the separator 45 produces an air flow from the first area A1 to the second area A2, moves waste D in the first screened material SB to the second area A2, and can more efficiently classify the first screened material SB.

This configuration produces an air flow from the first area A1 to the second area A2 by means of the mesh drum 48A itself. As a result, first screened material SB can be classified using a stronger air current in addition to the air flow produced by the defibrator blower 26 and the suction of the collection blower 473. The separator 45 can also be configured without separate blower, and the separator 45 can be compactly configured.

9. Other Embodiments

The embodiments described above are only examples of specific embodiments of the invention as described in the accompanying claims, do not limit the invention, and can be varied in many ways as described below without departing from the scope and spirit of the invention as described in the accompanying claims.

The foregoing embodiments describe a separator 45 having three subunits 450A, 450B, 450C, and a separator 45A having four subunits 450A-450D, but the separator 45 may be configured with only two subunits 450A, 450B, for example. This configuration enables continuously classifying the first screened material SB and supplying processing feedstock MC except during the period when the subunits 450A, 450B transition (move) between the first state and second state.

The mesh drum 48 may also be driven rotationally by a motor not shown in the foregoing embodiments. The direction of rotation of the mesh drum 48 is not limited to the direction of rotation R shown in the figures, and the mesh drum 48 by also turn in the opposite direction. The mesh drum 48 may also switch the direction of rotation R between forward rotation and reverse rotation. The disposition of the separator 45, 45A can also be changed as desired as long as the first opening 452 is positioned higher than the second opening 453.

The foregoing embodiments describe configurations in which the separator 45, 45A separates first screened material SB classified by the classifier 40 into processing feedstock MC and waste D, and supplies the processing feedstock MC to the mixing device 50. The invention is not so limited, however, and the defibrated material output from the defibrator 20 may be classified by the separator 45 to extract and supply processing feedstock MC to the mixing device 50.

Whether using separator 45 or separator 45A, the sheet manufacturing apparatus 100 is also not limited to manufacturing sheets S, and may be configured to make rigid sheets or paperboard comprising laminated sheets, or other web products. The manufactured product is also not limited to paper, and may be nonwoven cloth. The properties of the sheets S are also not specifically limited, and may be paper products that can be used as recording, writing, or printing on (such as copier paper, plain paper); wallpaper, packaging paper, color paper, drawing paper, or bristol paper. When the sheet S is nonwoven cloth, it may be common nonwoven cloth, fiber board, tissue paper, kitchen paper, vacuum filter bags, filters, liquid absorption materials, sound absorption materials, cushioning materials, or mats.

The sheet manufacturing apparatus 100 is described as a dry process sheet manufacturing apparatus 100 that defibrates feedstock MA in air, and forms sheets S using this material and resin. Application of the invention is not limited to such a device, however, and can be applied to a wet process sheet manufacturing apparatus that creates a solution or slurry of feedstock containing fiber in water or other solvent, and processes the feedstock into sheets. The invention can also be applied to an electrostatic sheet manufacturing apparatus that causes material containing fiber defibrated in air to adhere to the surface of a drum by static electricity, for example, and then processes the feedstock adhering to the drum into sheets.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2017-240284, filed Dec. 15, 2017 is expressly incorporated by reference herein.

What is claimed is:

1. A fiber processing device comprising:
a mesh member configured as a rotatable cylinder having a circumferential surface around a rotation axis of the cylinder and a first bottom surface and a second bottom surface opposed to and separated from each other along the rotation axis, the mesh member having mesh in at least part of the circumferential surface; and
a case housing the mesh member, and having a first opening and a second opening communicating with a first area inside of the mesh member, and a third opening communicating with a second area outside the mesh member, the first opening and the second opening being formed on the first bottom surface;
the fiber processing device supplying separator feedstock containing fiber from the first opening to the first area,
discharging from the third opening a first component of the separator feedstock that past by an air current through the mesh member and moved from the first area to the second area, and
discharging from the second opening a second component of the separator feedstock that did not pass through the mesh member by the air current and remained in the first area.

2. The fiber processing device described in claim 1, wherein:
the mesh member has multiple blades arrayed in the circumferential direction on the circumferential surface.

3. The fiber processing device described in claim 1, wherein:
the mesh member has multiple openings that are longer along the axis of rotation than the circumferential direction.

4. The fiber processing device described in claim 1, further comprising:
a cleaner configured to remove from the mesh member the second component accumulated in the first area on an inside surface of the mesh member.

5. The fiber processing device described in claim 1, wherein:
the second opening is disposed vertically lower than the first opening in the state in which the fiber processing device is installed and operates.

6. The fiber processing device described in claim 1, wherein:
the second opening is configured to connect to a vacuum configured to suction the second component.

7. The fiber processing device described in claim 1, wherein:
the first opening is configured to connect to a first air current generator configured to supply an air current from the first area to the second area.

8. The fiber processing device described in claim 6, wherein:
the third opening is configured to connect to a second air current generator configured to supply an air current from the first area to the second area.

9. The fiber processing device described in claim 1, wherein:
the fiber processing device is configured to switch between a first state in which separator feedstock is supplied with an air current from the first opening to the first area, and the air current moves the first component from the first area to the second area, and discharges the first component from the third opening, and
a second state in which a second component of the separator feedstock that did not pass through the mesh member in the first state and remained in the first area is recovered with an air current to the second opening.

10. A fibrous feedstock recycling device comprising:
a defibrator configured to defibrate feedstock containing fiber;
a processor configured to process defibrated material produced by the defibrator;
a conveyor configured to convey the defibrated material by an air conveyance current from the defibrator to the processor; and
a separator disposed to the conveyor, and including
a mesh member configured as a rotatable cylinder having a circumferential surface around a rotation axis of the cylinder and a first bottom surface and a second bottom surface opposed to and separated from each other along the rotation axis, the mesh member having mesh in at least part of the circumferential surface; and
a case housing the mesh member, and having a first opening and a second opening communicating with a first area inside of the mesh member, and a third opening communicating with a second area outside the mesh member, the first opening and the second opening being formed on the first bottom surface;

the separator supplying separator feedstock containing fiber from the first opening to the first area, discharging from the third opening a first component of the separator feedstock that past by an air current through the mesh member and moved from the first area to the second area, and discharging from the second opening a second component of the separator feedstock that did not pass through the mesh member by the air current and remained in the first area.

11. A fibrous feedstock recycling device comprising:

a separator including a mesh member configured as a rotatable cylinder having a circumferential surface around a rotation axis of the cylinder and a first bottom surface and a second bottom surface opposed to and separated from each other along the rotation axis, the mesh member having mesh in at least part of the circumferential surface, and a case housing the mesh member, and having a first opening and a second opening communicating with a first area inside of the mesh member, and a third opening communicating with a second area outside the mesh member, the first opening and the second opening being formed on the first bottom surface;

an air current generator configured to produce an air current inside the case; and a controller configured to change a state of the air current generator between a first state producing an air current from the first area to the second area, and a second state producing an air current from the second area to the first area.

12. The fibrous feedstock recycling device described in claim 11, further comprising:

a supplier configured to supply separator feedstock containing fiber to the first area, and a collector configured to recover a second component that did not move from the first area to the second area by an air current flowing from the first area to the second area, connected to the first opening;

a first control valve disposed between the first opening and the supplier, and changing to a state in which the separator feedstock can be supplied from the supplier to the first opening, and a state in which the separator feedstock cannot be supplied; and a second control valve disposed between the first opening and the collector, and changing to a state in which the second component can be collected by the collector from the second opening, and a state in which the second component cannot be collected;

the controller changing the state of the first control valve and the second control valve appropriately to the change between the first state and second state.

13. The fibrous feedstock recycling device described in claim 11, further comprising:

a first separator and a second separator;

the controller repeatedly alternating the operating mode between a first mode in which the state of the air current generator to the first separator is the first state, and the state of the air current generator to the second separator is the second state; and a second mode in which the state of the air current generator to the first separator is the second state, and the state of the air current generator to the second separator is the first state.

* * * * *